US010613726B2

(12) United States Patent
Cohen et al.

(10) Patent No.: US 10,613,726 B2
(45) Date of Patent: Apr. 7, 2020

(54) REMOVING AND REPLACING OBJECTS IN IMAGES ACCORDING TO A DIRECTED USER CONVERSATION

(71) Applicant: Adobe Inc., San Jose, CA (US)

(72) Inventors: Scott David Cohen, Sunnyvale, CA (US); Brian Lynn Price, San Jose, CA (US); Abhinav Gupta, New York, NY (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 15/852,253

(22) Filed: Dec. 22, 2017

(65) Prior Publication Data

US 2019/0196698 A1    Jun. 27, 2019

(51) Int. Cl.
| | | |
|---|---|---|
| *G09G 5/10* | (2006.01) | |
| *G06F 3/0484* | (2013.01) | |
| *G06T 11/60* | (2006.01) | |
| *G10L 15/22* | (2006.01) | |
| *G06K 9/46* | (2006.01) | |
| *G06F 16/58* | (2019.01) | |
| *G06F 16/532* | (2019.01) | |
| *G06K 9/36* | (2006.01) | |

(52) U.S. Cl.
CPC ........ *G06F 3/04845* (2013.01); *G06F 16/532* (2019.01); *G06F 16/58* (2019.01); *G06K 9/4609* (2013.01); *G06T 11/60* (2013.01); *G10L 15/22* (2013.01); *G06K 2009/363* (2013.01); *G06K 2009/366* (2013.01)

(58) Field of Classification Search
CPC . G06T 11/60; G06T 19/00; G06T 1/00; G06F 9/4443; G06F 3/0481

USPC ......................................................... 345/619
See application file for complete search history.

(56) References Cited

U.S. PATENT DOCUMENTS

| | | | | |
|---|---|---|---|---|
| 8,375,397 | B1 * | 2/2013 | Mendes da Costa | ........................ H04L 12/1827 707/792 |
| 8,861,868 | B2 * | 10/2014 | Shechtman | ............. G06T 11/60 382/218 |

(Continued)

OTHER PUBLICATIONS

Laput, G. etc. PixelTone: A Multimodal Interface for ImageEditing. CHI 2013, Apr. 27-May 2, 2013, Paris, France [online], [retrieved on Jan. 31, 2019]. (Year: 2013).*

(Continued)

*Primary Examiner* — Gordon G Liu
(74) *Attorney, Agent, or Firm* — SBMC

(57) ABSTRACT

Systems and techniques are described herein for directing a user conversation to obtain an editing query, and removing and replacing objects in an image based on the editing query. Pixels corresponding to an object in the image indicated by the editing query are ascertained. The editing query is processed to determine whether it includes a remove request or a replace request. A search query is constructed to obtain images, such as from a database of stock images, including fill material or replacement material to fulfill the remove request or replace request, respectively. Composite images are generated from the fill material or the replacement material and the image to be edited. Composite images are harmonized to remove editing artifacts and make the images look natural. A user interface exposes images, and the user interface accepts multi-modal user input during the directed user conversation.

20 Claims, 8 Drawing Sheets

(56) References Cited

U.S. PATENT DOCUMENTS

| | | | |
|---|---|---|---|
| 2003/0190090 A1* | 10/2003 | Beeman | G06T 11/60 |
| | | | 382/284 |
| 2015/0078628 A1 | 3/2015 | Anderson | |
| 2015/0371422 A1 | 12/2015 | Kokemohr | |
| 2018/0204111 A1 | 7/2018 | Zadeh et al. | |

OTHER PUBLICATIONS

Laput, G. etc. PixelTone: A Multimodal Interface for Image Editing. CHI 2013, Apr. 27-May 2, 2013, Paris, France [online], [ retrieved on Jan. 31, 2019]. Retrieved from the internet <URL: http://www.cond.org/pixeltone_compressed.pdf> (Year: 2013).*

"Search Report", GB Application No. 1817165.2, dated Mar. 29, 2019, 5 pages.

Akay,"A System for Medical Consultation and Education Using Multimodal Human/Machine Communication", IEEE Transactions on Information Technology in Biomedicine, vol. 2, No. 4, Dec. 1998, pp. 282-291.

\* cited by examiner

REMOVING AND REPLACING OBJECTS IN IMAGES ACCORDING TO A DIRECTED USER CONVERSATION

BACKGROUND

The proliferation of digital cameras, both stand-alone (e.g., digital single-lens reflex cameras) and cameras integrated into computing devices (e.g., included in a smart phone) has caused a proliferation of images for many users. Often times, images are less than perfect. For instance, an image may be taken by a novice, and thus be poorly composed, or circumstances, such as weather, may influence a background (e.g., color of the sky) in an image. Hence, a user may desire to edit an image, such as with an image editing application. To accomplish editing tasks with an image editing application and produce a naturally-appearing image (e.g., an image in which an observer cannot distinguish where in the image the editing occurred) requires a significant skill level and effort, because of the complexity of the editing process. For instance, a trained professional (e.g., one skilled in use of the image editing application) may take hours to produce a single image according to a request to merely replace an object in the image with another object, such as an object from another image.

Because of the complexity of the image editing process, and the infinite variety of words a user can speak in various languages and with various dialects, most image editing applications either do not include voice interfaces, or have limited abilities for fulfilling limited spoken commands. For instance, Adobe's PixelTone application can receive a spoken editing query from a user for an image to be edited, such as "Make the man brighter", but the PixelTone application has no semantic knowledge of the image, and does not participate in a user conversation. Consequently, the user must first manually select "the man" in the image in this example, such as by painting over the man with a paintbrush tool, before requesting to "Make the man brighter", which significantly limits the usefulness of the voice interface. Hence, image editing applications do not direct a user conversation, but rather merely receive limited spoken commands.

Moreover, image editing applications do not receive multi-modal user input, including a complementary user input during a user conversation in addition to speech input during the user conversation. Consequently, image editing applications with voice interfaces are limited to the effectiveness of the image editing application to process spoken input, without gaining the benefit of other forms of user input during a user conversation.

SUMMARY

Techniques and systems are described to direct a user conversation that includes an editing query for an image to be edited and provide a plurality of harmonized images that satisfy the editing query. A conversation can be directed by broadcasting a query to a user, receiving a user response, and responding to the user based on the user response. A directed user conversation can include multi-modal input. In one example, results are exposed to a user during a directed user conversation, and multi-modal input is received as part of the directed user conversation (e.g., spoken instructions and an indicator from a mouse to confirm selection of an object). In this way, images can be efficiently provided to a user that satisfy an editing query and at the same time instruct the user on the use of the editing application while using the user's actual data, rather than a tutorial with canned data.

A directed user conversation is processed, e.g., with a natural language processor, to determine whether the directed user conversation indicates a remove request or a replace request. Furthermore, an object is identified from the user conversation, such as an object to be removed, an object to be replaced, an object to replace another object, combinations thereof, and the like. Pixels of the image to be edited corresponding to an object to be removed or replaced are ascertained, e.g., with a computer vision processor. In one example, a vision module specific to the object is used, such as using a sky vision module including a neural network trained to identify skies when satisfying the replace request "Replace the boring sky with a cloudy sky". Images are obtained from a database of stock images that include fill material to fill in a hole when an object is removed, or replacement material to replace an object according to a replace request. Based on the directed user conversation indicating a remove request or replace request, an object is removed and fill material is added in its place, or an object is replaced with replacement material, to produce a plurality of composite images that are harmonized to make the editing appear natural. Multiple harmonized images are exposed in a user interface. Thus, a user is presented a plurality of options (e.g., harmonized images with different versions of fill material or replacement material) that satisfy the editing query based on a directed user conversation. In one example, the plurality of images are presented to the user automatically and without user intervention once a directed user conversation is completed and an image to be edited is obtained. In another example, intermediate results are exposed to the user, and multi-modal input is received during a directed user conversation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
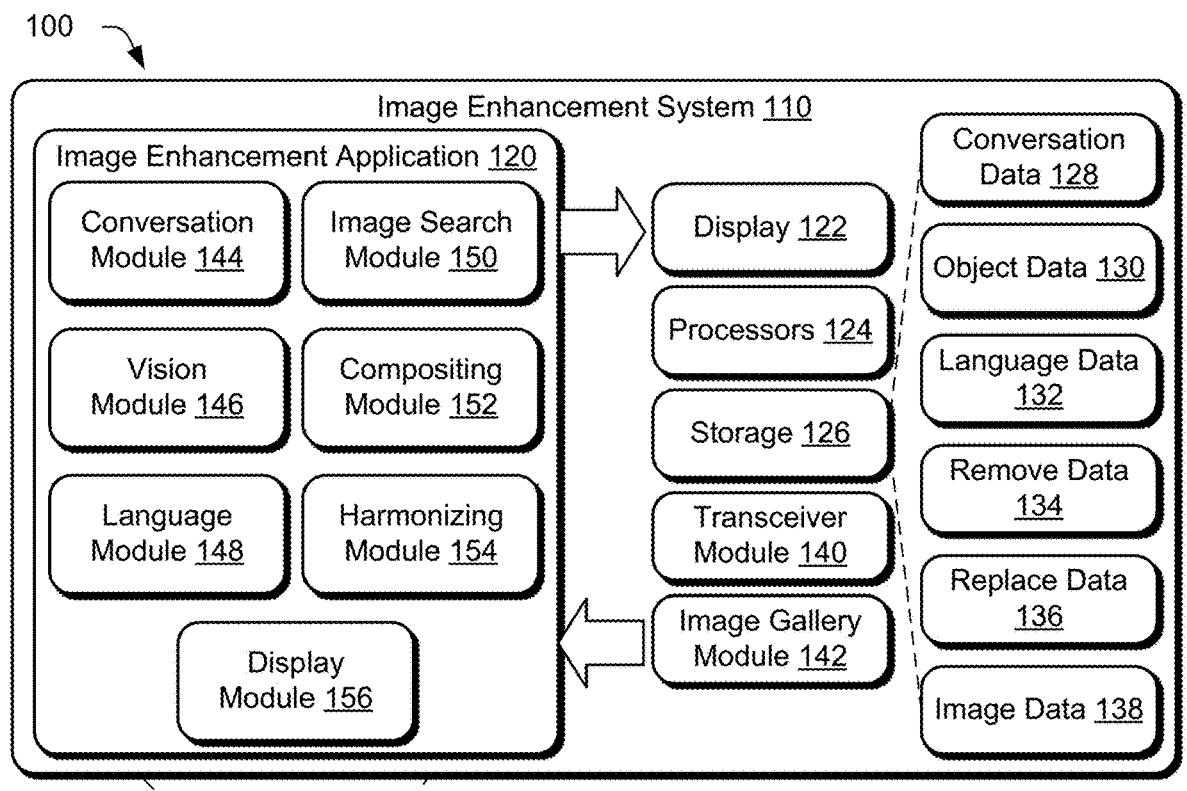
FIG. 1 illustrates a digital medium environment in an example implementation that is operable to employ techniques described herein.
Figure 1:
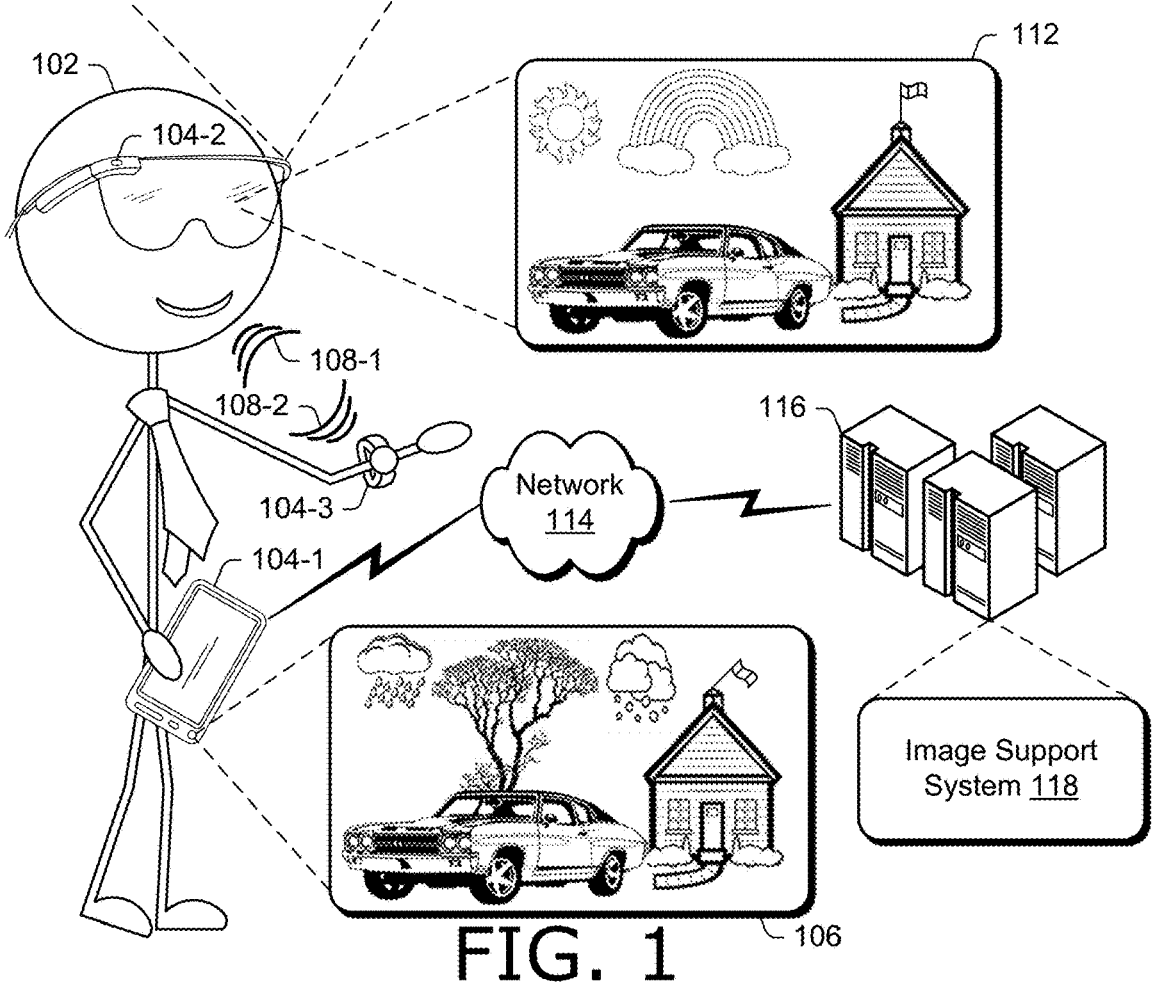

Among the most common requests to edit an image are remove requests and replace requests. For instance, "remove the fire hydrant from the image" and "replace the background in the image with a street scene in Paris" are examples of a remove request and replace request, respectively. Because of the complexity of image editing operations (e.g., the number of operations, the order of operations, and the numbers of parameters that must be properly set for each operation), and the infinite variety of words a user can speak in various languages and with various dialects, most image editing applications either do not include voice interfaces, or have limited abilities for fulfilling limited spoken commands. For instance, image editing applications do not direct a user conversation, but rather merely receive limited spoken commands. Moreover, image editing applications do not receive multi-modal user input, including a complementary user input during a user conversation in addition to speech input during the user conversation. Consequently, image editing applications with voice interfaces are limited to the effectiveness of the image editing application to process limited spoken commands, without gaining the benefits of a directed user conversation, including a complementary user input during a directed user conversation in addition to speech input during the directed user conversation.

Accordingly, this disclosure describes systems and techniques for directing a user conversation to obtain an editing query, and providing a plurality of images that have been enhanced by fulfilling a remove request or a replace request with different content, such as content obtained from a database of stock images, based on the editing query. Multi-modal user input can be received during the directed user conversation, including a complementary user input to speech input (e.g., a mouse click, touch on a touchscreen, and the like) during the directed user conversation, to increase the reliability of communications between a user and a computing device. A user conversation can be directed by broadcasting a query to a user, receiving a user response, and responding to the user based on the user response. Received user responses are processed to determine parameters of an editing query, such as whether the user conversation indicates a remove request or replace request, objects to be removed, objects to be replaced, objects to replace objects, modifiers of objects, combinations thereof, and the like. The directed user conversation can include broadcasting a query, receiving a user response, and responding to a user response any suitable number of times, e.g., initiated by an image editing application on a computing device. The scope of questioning for each volley of questioning and response in the directed user conversation can be set in any suitable way, such as based on a previously received user response, whether an editing query indicates a remove request or replace request, availability of resources to fulfill an editing request, and the like.

Based on parameters of the directed user conversation, a plurality of parameters is obtained that include fill material to fill a hole created when an object is removed according to a remove request, or replacement material to replace an object according to a replace request. In one example, fill material is recognized as similar to different pixels of the image than the pixels of the image corresponding to an object to be removed. For instance, when removing a fire hydrant from a lawn, the fill material may be similar to pixels of the lawn. In one example, replacement material is recognized as similar to pixels of the image corresponding to an object to be removed (e.g., when replacing a boring sky with a cloudy sky, the pixels are similar because they represent skies). Furthermore, the replacement material corresponds to the replace request (e.g., when a replace request indicates replacing a boring sky with a cloudy sky, replacement material represents a cloudy sky indicated by the replace request).

Images with fill material or replacement material can be obtained from any suitable sources, such as from a database of stock images, a user's image gallery (e.g., images uploaded to an on-line photo sharing site), a user's library of images (e.g., files stored on a user's computer), an image obtained from an on-line social media post, an image sent or attached in an email by a user, and the like.

An image to be edited is obtained (e.g., a user loads the image into an image editing application). The image to be edited is processed by a vision module that can be specific to an object, such as an object to be replaced. For instance, a sky vision module including a neural network trained to identify skies is used to ascertain pixels of a sky in an image when an object to be replaced in the image is identified as a sky, such as for the replace request "Replace the boring sky with a cloudy sky". Moreover, ascertaining the pixels corresponding to an object in an image can include generating an object mask for the object, dilating the object mask to create a region bounded by a boundary of the object mask, and generating a refined mask representing the pixels corresponding to the object by separating a background from a foreground in the region. Furthermore, contributions to pixels in the region from the background of the image can be removed in a background decontamination process.

Responsive to determining whether an editing query indicated in the directed user conversation includes a remove request or a replace request, a plurality of composite images are formed from the image to be edited and fill material or replacement material, respectively. The composite images are harmonized to make them look natural (e.g., so that the editing is not easily detected). In one example, harmonizing includes adjusting lighting of a composite image to match times of day between image materials. For instance, the lighting of replacement material may be matched to a section of the image by adjusting a shadow in the replacement material according to a time of day of the image. Harmonized images are exposed in a user interface, so that a plurality of options that satisfy a remove request or a replacement request are presented to a user. In one example, each option exposed in the user interface includes fill material or replacement material from a different image, so that a user is able to select from among the exposed options an image most personally satisfying the editing query to the user.

In one example, intermediate results are exposed in a user interface. For instance, an image may be presented to a user with an indicator of a candidate object, such as a lasso surrounding an object requested to be replaced in an editing query. To confirm selection of the candidate object, multi-modal input is received. Multi-modal input includes multiple forms of input received during a directed user conversation to indicate a same action. For instance, spoken instructions (e.g., "Move the lasso towards the fire hydrant and away from the dog's head") and a selection from a mouse (e.g., a mouse click, hold, and drag of a lasso) to confirm selection of an object. Consequently, images are efficiently presented to a user that satisfy an editing query, and at the same time instruct the user on the use of the editing application while operating on the user's actual data, rather than a tutorial with canned data. Hence, a user is able to efficiently communicate with a computing device (e.g., a personal assistant) implementing the techniques described herein, and does not have to rely on an additional party, like an on-line editing service, friend, co-worker, or acquaintance, to enhance an image by removing or replacing objects in the image. As a result, a user is able to automatically obtain multiple harmonized images without appreciable delay (e.g., seconds or minutes, rather than hours, days, or weeks) that each fulfill the user's spoken query by participating in a directed user conversation, providing multi-modal input, or combinations thereof.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device (e.g., a mobile device). In the example in FIG. 1, user 102 is illustrated as having three computing devices, computing devices 104-1, 104-2, and 104-3 (collectively 104). For instance, computing device 104-1 depicts a tablet, computing device 104-2 depicts a pair of eye glasses (e.g., smart goggles), and computing device 104-3 depicts a smart watch. Computing devices 104 are example computing devices, and any suitable computing device is contemplated, such as a mobile phone, tablet, laptop computer, desktop computer, gaming device, goggles, glasses, camera, digital assistant, echo device, image editor, non-linear editor, digital audio workstation, copier, scanner, and the like. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, and the like. Thus, computing devices 104 can recognize multiple types of gestures including touch gestures and gestures provided through a natural user interface. In one example, computing devices 104 include speech recognition, identification, and synthesis functionalities, microphones, and speakers that allow computing devices 104 to communicate with user 102 in a conversation, e.g., a directed user conversation.

Figure 8:
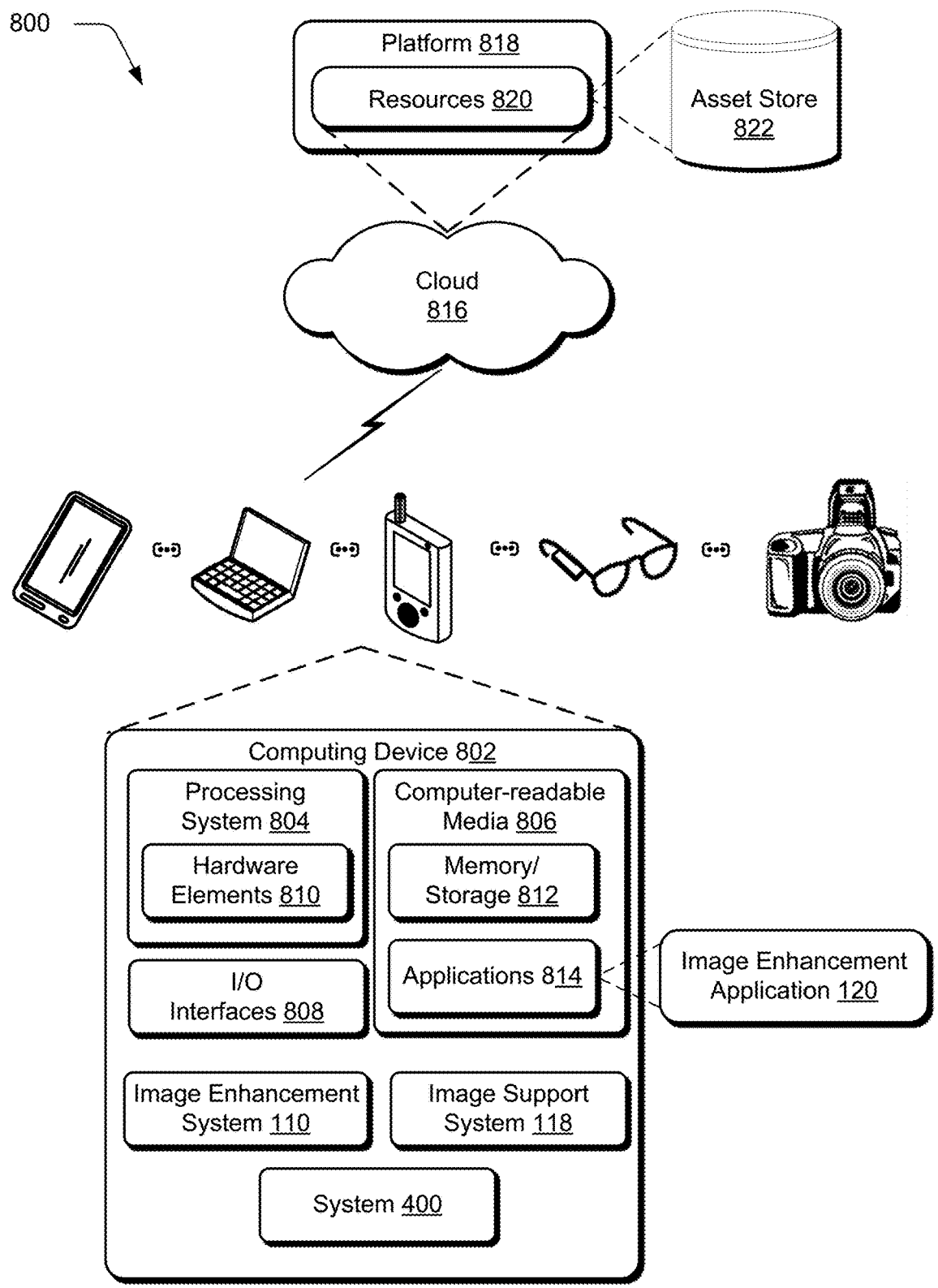
FIG. 8 illustrates an example system including various components of an example device that can be implemented as any type of computing device as described and/or utilized with reference to FIGS. 1-7 to implement aspects of the techniques described herein.

Furthermore, computing devices 104 may be representative of one or a plurality of different devices, such as one or more devices connected to a network that perform operations "over the cloud" as further described in relation to FIG. 8. In one example, computing devices 104 are communicatively coupled to each other, such as with a low power wireless communication standard (e.g., a Bluetooth® protocol). For instance, computing device 104-1 can communicate wirelessly with computing device 104-2 and computing device 104-3. Hence, an image generated or stored on one device (e.g., computing device 104-1) can be communicated to, and displayed on another device (e.g., computing device 104-2).

In the example illustrated in FIG. 1, computing device 104-1 obtains an image to be edited 106. An image to be edited 106 can be obtained in any suitable way, such as from another computing device, from file storage on computing device 104-1 (discussed in more detail below), by taking a picture with a camera on computing device 104-1, and the like. In the example in FIG. 1, the image to be edited 106 includes a car by a house, with a tree and rain clouds in the background. Also observe that a flagpole on top of the house in the image to be edited 106 is bent.

Computing device 104-3 directs a user conversation 108 including speech 108-1 from user 102 and speech 108-2 from computing device 104-3 (e.g., speech 108-1 and speech 108-2 collectively form user conversation 108, a directed user conversation). In the example in FIG. 1, user conversation 108 includes an editing query for the image to be edited 106, such as "Replace the rainy background with a sunny day". User conversation 108 can include any suitable number of volleys of speech 108-1 from user 102 and speech 108-2 from computing device 104-3, in a directed conversation format. In one example, instead of a user 102 including a replace request in one volley of conversation 108, such as "Replace the rainy background with a sunny day", conversation 108 may include multiple volleys of questions and answers in a directed, interview style from which an editing query including a remove request or replace request is construed, such as Computing device 104-3: Would you like to remove or replace today?

User 102: Replace

Computing device 104-3: What would you like to replace?

User 102: The rainy background

Computing device 104-3: What would you like to replace the rainy background with?

User 102: A sunny day.

Based on user conversation 108, computing device 104-2 uses image enhancement system 110 (discussed in more detail below) to enhancement the image to be edited 106 according to an editing query and provide harmonized image 112 to a user interface on computing device 104-2 (e.g., a head mounted display). Additionally or alternatively, harmonized image 112 can be displayed on a display screen of computing device 104-1 or computing device 104-3. Continuing the example in FIG. 1, harmonized image 112 is enhanced according to the editing query, because the rainy background of the image to be edited 106 has been replaced with a background of a sunny day including a rainbow.

Furthermore, the flagpole on the house in harmonized image 112 has been corrected (e.g., straightened).

Computing devices 104 are also coupled to network 114. Network 114 communicatively couples computing devices 104 with server 116 (for clarity, only computing device 104-1 is illustrated in FIG. 1 as coupled to network 114, though computing devices 104-2 and 104-3 can also be coupled to server 116 via network 114). Network 114 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 116 may include one or more servers or service providers that provide services and/or resources to computing devices 104. Generally, resources provided by server 116 may be licensed, purchased, or may be made freely available, (e.g., without authentication, license, or account-based access). The resources can include any suitable combination of services and content, such as made available over network 114 by one or more providers. Some examples of services include, but are not limited to, an on-line shopping service, a photo editing service, a web development and management service, a collaboration service, a social networking service, a messaging service, an advertisement service, a graphics design service, an image storage service (including storage of photos, documents, records, files, and the like), and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), and the like.

Server 116 includes image support system 118 configurable to receive signals from computing devices 104, process the received signals, and send the processed signals to computing devices 104 to support removing and replacing objects in an image. For instance, computing device 104-1 may obtain an image to be edited 106 and communicate it to server 116. Using image support system 118, server 116 can generate harmonized image 112 from the image to be edited 106 received by computing device 104-1, and send harmonized image 112 back to computing device 104-1 to be displayed on computing device 104-1 or any suitable computing device. Accordingly, image support system 118 of server 116 can include a copy of image enhancement system 110, including image enhancement application 120 (discussed below in more detail).

Computing devices 104 include image enhancement system 110 to remove and replace objects in an image, such as image to be edited 106. For clarity, computing device 104-2 is illustrated in FIG. 1 as including image enhancement system 110, though computing device 104-1 and computing device 104-3 also include copies of image enhancement system 110 (not shown).

Image enhancement system 110 includes a display 122 for displaying images, such as image to be edited 106, harmonized image 112, and the like. Display 122 can be any suitable type of display, such as a touchscreen, liquid crystal display, plasma display, head-mounted display, projector and screen, and the like. Image enhancement system 110 also includes processors 124. Hence, image enhancement system 110 may be implemented at least partially by executing instructions stored on storage 126 on processors 124. For instance, processors 124 may execute portions of image enhancement application 120.

Storage 126 can be any suitable type of storage accessible by or contained in image enhancement system 110. Storage 126 stores and provides access to and from memory included in storage 126 for any suitable type of data. For instance, storage 126 includes conversation data 128 (e.g., data related to conversation 108, such as a recording of conversation 108, a transcript of conversation 108, moods of a user deduced from conversation 108, e.g., based on lengths of times between volleys in conversation 108, amplitude of speech 108-1 from user 102, and the like), object data 130 (e.g., data representing objects in images, such as pixels of objects to be removed or replaced, masks of objects to be removed or replaced, locations of objects in image to be edited 106, and the like), language data 132 (e.g., results of language analysis of conversation 108, such as parts-of-speech of conversation 108, subject-object pairs, lists of words related to subjects, objects, or both, synonyms of objects, search query strings, and the like), remove data 134 (e.g., data regarding a remove request, such as a number and type of objects to be removed, indicators of availability of object-specific modules related to an object to be removed, copies of data that is removed from an image to be edited 106, and the like), replace data 136 (e.g., data regarding a replace request, such as a number and type of objects to be replaced, descriptions of replacement objects to replace the objects, indicators of availability of object-specific modules related to an object to be replaced, copies of data that is replaced in an image to be edited 106, and the like), and image data 138 (e.g., data representing any suitable images, such as an image to be edited 106, composite images, harmonized images (e.g., harmonized image 112), images obtained that include fill material or replacement material, harmonization data, and the like).

Furthermore, image enhancement system 110 includes transceiver module 140. Transceiver module 140 is representative of functionality configured to transmit and receive data using any suitable type and number of communication protocols. For instance, data within image enhancement system 110 may be transmitted to server 116 with transceiver module 140. Furthermore, data can be received from server 116 with transceiver module 140. Transceiver module 140 can also transmit and receive data between computing devices 104.

Image enhancement system 110 also includes image gallery module 142. Image gallery module 142 is representative of functionality configured to maintain images associated with a user, such as user 102. For instance, image gallery module 142 can manage image libraries of a user, including images stored in a user's image editing application, such as Photoshop®. Furthermore, image gallery module 142 integrates images a user manipulates on or from one of computing devices 104 into a gallery of images stored on storage 126, such as images a user posts in a social media post or blog from one of computing devices 104, images a user has attached to an email, text, or other communication sent from or received by computing devices 104, and the like. Image gallery module 142 makes image from galleries maintained by image gallery module 142 available to image enhancement application 120, e.g., to be used for fill material or replacement material. Images maintained by image gallery module 142 can be stored in image data 138.

Image enhancement system 110 also includes image enhancement application 120. Image enhancement application 120 includes conversation module 144, vision module 146, language module 148, image search module 150, compositing module 152, harmonizing module 154, and display module 156. These modules work in conjunction with each other to direct a user conversation and remove and replace objects in an image to be edited and expose a plurality of harmonized images based on the directed user conversation.

Furthermore, though the description of image enhancement system 110 and image enhancement application 120 describes remove requests and replace requests, the systems, procedures, and devices described herein are not limited to remove requests and replace requests. Remove requests and replace requests are described as examples of editing functions because they are among the most common editing functions included in editing queries. However, the systems, procedures, and devices described herein, including image enhancement system 110 and image enhancement application 120, are also operable to process other editing functions included in or indicated by an editing query in a directed user conversation, including a move request (to move an object within an image), a duplicate request (to duplicate an object in an image), an add request (to add an object in an image), an opaque request (to adjust the opacity of an object), a brighten request (to make an object brighter), a color request (to adjust a color of an object), a pattern request (to adjust a pattern of an object), and the like.

Conversation module 144 is representative of functionality configured to direct a user conversation that includes an editing query for an image to be edited. User conversation 108 is an example of a user conversation in which conversation module 144 can direct. A user conversation can be any suitable type of conversation from which an editing query can be extracted. A user conversation can include any suitable type of communication, such as verbal communication (e.g., with microphones and speakers of conversation module 144), written communication (e.g., a user may type into a keyboard or provide a document to conversation module 144), or combinations of verbal communication and written communication. In one example, a user conversation is a directed user conversation, such as in the form of an interview with questions and answers that indicate an editing query. For instance, conversation module 144 may initiate a user conversation based on an event, such as a user indicating an image to be edited, e.g., by loading image to be edited 106 into image enhancement application 120. An example of a directed user conversation with verbal communication in an interview format is:
   DEVICE: Hello, would you like to remove or replace something in the image?
   USER: Yes, replace
   DEVICE: What would you like to replace?
   USER: The boring sky
   DEVICE: What you like to replace the boring sky with?
   USER: A cloudy sky with lightning.
Additionally or alternatively, a directed user conversation includes an editing query from a user, such as "Remove the fire hydrant next to the dog". Hence, a directed user conversation can be any suitable conversation between a computing device (e.g., one of computing devices 104) and a user (e.g., user 102), and include any suitable number of volleys of speech. The scope of questioning for each volley of questioning and response in the directed user conversation can be set in any suitable way, such as based on a previously received user response, whether an editing query indicates a remove request or replace request, availability of resources to fulfill an editing request, and the like. In one example, the scope of questioning is narrowed with each volley of a directed user conversation, such as by obtaining more detail about a previous answer with each volley.

Accordingly, conversation module 144 includes or has access to a microphone array and a speaker array to broadcast speech and receive speech from a user, respectively. For instance, conversation module 144 can broadcast an editing query (e.g., "What would you like to remove or replace in the image"), and receive a confirmation from a user indicating an object and an indication of a replace request or an indication of a remove request (e.g., "Remove the fire hydrant"). Furthermore, conversation module 144 can include any suitable type of control to direct a user conversation, such as a neural network that generates questions for conversation module 144 to ask in a user conversation based on answers to previous questions received from a user. In one example, conversation module 144 may determine questions to ask during a user conversation by preemptively initiating a search of an image database for details of available images. For instance, if during the course of a user conversation a user requests to "add an old pickup truck" to an image to be edited, conversation module 144 may initiate a search of a database of stock images to identify what types of old pickup trucks are included in images of the database, and provide an appropriate question in reply to the user, such as "Would you like a 1946 Chevrolet or a 1955 Ford pickup truck?" based on the database including images with a 1946 Chevrolet pickup truck and a 1955 Ford pickup truck.

Conversation module 144 provides an editing query included in (or indicated by) a directed user conversation to modules of image enhancement system 110. An editing query provided by conversation module 144 can be any suitable type of editing query. In one example, an editing query includes a transcript of a directed user conversation (e.g., text in ASCII format). Additionally or alternatively, an editing query can include a data structure populated by words or indicators of words of a directed user conversation. For instance, a data structure may include a function field populated by an indicator of an editing function of an editing query, such as 0 for remove, 1 for replace, 2 for move, 3 for duplicate, 4 for add, 5 for brighten, 6 for darken, 7 for sepia filter, and the like. A replacement field may be populated with a description of an object that is to replace another object, such as "cloudy sky, lightning" in the example directed user conversation above.

An editing query determined by conversation module 144, along with any suitable information, such as text of a directed user conversation, a number of volleys of speech in a directed user conversation, user data (e.g., user preferences, user history including numbers and types of images and editing functions performed by or for a user, etc.), microphone settings, speaker settings, and the like, used by or calculated by conversation module 144 are stored in conversation data 128 of storage 126 and made available to modules of image enhancement application 120.

Vision module 146 is representative of functionality configured to ascertain pixels of an image to be edited corresponding to an object to be removed or replaced indicated in a directed user conversation. Vision module 146 performs a segmentation of pixels in an image to be edited to determine pixels corresponding to an object in any suitable way. In one example, vision module 146 includes one or more neural networks that have been trained to identify a specific object, such as a sky, fire hydrant, background, car, person, face, and the like. Hence, vision module 146 can use a neural network trained to identify a specific object indicated by an editing query when ascertaining pixels of the object in the image to be edited. For instance, if an editing query includes a remove request "Remove the fire hydrant", vision module 146 ascertains pixels in the image that correspond to a fire hydrant using a neural network trained to identify fire hydrants with training images including variations of fire hydrants. Additionally or alternatively, vision module 146 ascertains pixels in an image to be edited that correspond to an object in an image using a neural network that is not trained to identify the specific object, such as a neural network trained to identify insects, birds, or bats when the object to identify is a butterfly.

Moreover, vision module 146 can ascertain pixels of an image to be edited for any suitable number of objects in the image. Hence, if an editing query includes the remove request "Remove the people from the image", vision module 146 can ascertains pixels in the image that correspond to multiple persons by iteratively using a neural network trained to identify a person, or by using a neural network trained to identify multiple persons (e.g., with training images including different groups of people).

In one example, vision module 146 segments pixels of an image into background and foreground pixels. Hence, vision module 146 can determine a background scene of an image, and the background scene may include multiple objects. For instance, for the request "Replace the background with a picture of Hawaii", vision module 146 may ascertain pixels of an image corresponding to a background scene that includes multiple objects, such as trees, rocks, the sun, the moon, stars, etc.

Furthermore, vision module 146 has semantic understanding of an image to be edited, and is therefore able to distinguish between objects in the image based on a description of the object in an editing query. For instance, if an editing query includes the remove request "Remove the man on the left", vision module 146 is able to distinguish "the man on the left" from other persons in the image, such as by using computer vision methods of operating neural networks trained by deeply learned models. Consequently, vision module 146 is able to efficiently and accurately ascertain pixels corresponding to an object indicated by an editing query by exploiting semantic knowledge of the image.

In one example, vision module ascertains pixels corresponding to an object by first determining a set of inverse pixels that do not include the pixels corresponding to the object. The pixels corresponding to the object are then determined from the set of inverse pixels, e.g., as a complementary set of pixels to the inverse pixels.

Moreover, vision module 146 may generate a mask representing segmented pixels of an object in an image to be edited. A mask may represent pixels without including content of the pixels. In one example, an object mask for an object is generated, e.g., by segmenting pixels of an image to be edited with a neural network trained to identify the object. The object mask can be refined to form a refined mask that captures details of the object, such as hair, leaves, etc. A refined mask can be generated from an object mask by dilating the object mask to create a region bounded by a boundary of the object mask (e.g., an interior region of the object mask), and separating a background of the image from a foreground of the image in the region.

Furthermore, vision module 146 may cause intermediate results to be exposed in a user interface. For instance, vision module 146 may provide an intermediate image in which an indicator of an object is displayed. Confirmation of the object can be received (e.g., using multi-modal input as discussed below in more detail), a user may adjust selection of the object, and vision module 146 can update pixels corresponding to an object based on confirmation or adjustment by a user.

Segmented pixels determined by vision module 146, along with any suitable information, such as a number of segmented objects, types of segmented objects (e.g., person, dog, fire hydrant, background, sky, tree, etc.), inverse pixels, object masks, refined masks, regions used in generating refined masks, a copy of an image to be edited, and the like, used by or calculated by vision module 146 are stored in object data 130 of storage 126 and made available to modules of image enhancement application 120.

Language module 148 is representative of functionality configured to determine whether an editing query includes a remove request or a replace request and parameters of the request, such as what to remove or replace, and what to replace it with. Language module 148 processes an editing query (e.g., provided by conversation module 144) in any suitable way to determine whether an editing query includes a remove request or a replace request and parameters of the request. In one example, language module 148 performs wordspotting on an editing query to identify keywords and modifiers of keywords. For instance, for the replace request "Replace the car with a blue truck", language module 148 identifies objects "car" and "truck" and adjective "blue" as keywords. Wordspotting to identify keywords can be done in any suitable way on an editing query, such as using a sliding window of words and processing the words under the sliding window, hypothesis testing, coding, decoding, combinations thereof, and the like. Additionally or alternatively, language module 148 processes an editing query using a natural language processor that has been trained with editing queries to gain an understanding of language.

Language module 148 determines a function of an editing request, such as whether an editing query includes a remove request or a replace request (e.g., by matching words or synonyms of words in an editing request to "remove" or "replace"). In one example, language module 148 determines whether an editing query includes a remove request or a replace request based on matching words of a directed user conversation to lists of words determined to be similar to remove or replace, respectively. Furthermore, language module can identify editing functions other than remove and replace, such as to move and object, adjust an opacity of an object, brighten part of an image, darken part of an image, adjust contrast, duplicate an object, add an object, move an object, and the like.

In one example, language module 148 processes an editing query by removing punctuations, special characters (e.g., asterisk and ampersand symbols), and stop words (e.g., the article "the"). Vectors are assigned for each remaining word in the editing query in a vector space. The vector space positions vectors of words such that words that share common contexts are located in close proximity to one another in the vector space. In one example, a word2vec function is used to produce vectors (e.g., for words and groups of words of an editing query).

Similarity scores between vectors of words and a vector for the editing query with punctuations, special characters, and stop words removed are determined based on cosine similarities of the vectors. Similarity scores can be compared to thresholds and to each other to determine an object to be removed or replaced. For instance, a similarity score for the word "sky" with the replace request "Replace the boring sky with a cloudy sky" will have a higher similarity score than the word "background" with the replace request "Replace the boring sky with a cloudy sky". On the other hand, a similarity score for the word "sky" with the replace request "Replace the background with a beach" will have a lower similarity score than the word "background" with the replace request "Replace the background with a beach". Hence, similarity scores determined from word vectors can be used to determine an object to be replaced or removed from an image.

Furthermore, language module 148 can identify subject-object pairs from an input query or string of words of a directed user conversation. As an example, a subject portion of an input query may denote what should be replaced or removed (e.g., a boring sky), and an object portion of an input query may denote what to replace the subject with (e.g., a cloudy sky). A string (e.g., editing query) is separated into a first part that contains words related to a subject portion of the subject-object pairs and a second part that contains words related to an object portion of the subject-object pairs. The first part and second part can be compiled into one or more lists of words, and used to obtain images with fill material, replacement material, or combinations thereof. For instance, language module 148 can provide lists of words with the first part and the second part generated by language module 148 to image search module 150, which obtains images including fill material based on a search of images using words of the first part, and obtains images including replacement material based on a search of images using words of the second part.

Additionally or alternatively, language module 148 can generate synonyms of words in an editing query, and the synonyms can be used to construct a search query (e.g., by image search module 150) or ascertain pixels of an image to be edited (e.g., by vision module 146). For instance, an editing query may include the remove request "Remove the ghost in the window". In this case, language module 148 may generate the word "reflection" as a synonym to "ghost", that can be passed to vision module 146 as an object to be segmented. Hence, rather than vision module 146 searching for a ghost (e.g., an apparition of a dead person), vision module 146 is instructed to search for reflections in a window. Furthermore, the word "ghost" may be flagged by language module 148 as a slang, ambiguous, or degenerate word, and thus can be given a relatively low weight (or ignored) when looking for objects in an image to be edited or generating a search query for images with fill material or replacement material.

In one example, language module 148 processes an editing query to obtain parameters of the editing query (e.g., what is being added, removed, replaced, moved, what an object is to be replaced with, a type of replacement request, such as a sky replacement request, a type of remove request, such as a person remove request, and the like) and directs operation of image enhancement application 120 by calling suitable functions in suitable orders based on the parameters of the editing query. For instance, the parameters can be passed as variables to functions and used to parameterize the functions. Furthermore, functions specific to an object being removed or replaced can be called. As an example, the pseudo code in Table 1 includes specific replacement and removal functions for replacement and removal of specific objects of a background and a sky, as well as general replacement and removal functions for objects.

TABLE 1

Pseudo-Code Parameterized From An Editing Query

```
// ImageReplace(I,X,Y): Replace X with Y in image I
function Iout = ImageReplace(I,X,Y) {
    replace_task = which_replacement_task(X);
    if (replace_task == BACKGROUND_REPLACEMENT)
        SX = ImageSelect(I,"background"); // get a mask of the background
        BGnew = ImageSearch(Y); //get new background image(s) for request Y
        J = ImageComposite(I,complement(SX),BGnew); // composite in the
        new background
        Iout = ImageHarmonize(J,complement(SX)); // harmonize so
        composite looks real
    } else if (replace_task == SKY_REPLACEMENT) {
        SX = ImageSelect(I,"sky" ); // get a mask of the sky
        SKYnew = ImageSearch(Y); // get new sky image(s) for request Y
        J = ImageComposite(I,complement(SX),SKYnew); // composite in the
        new sky
        Iout = ImageHarmonizeSky(J,complement(SX)); // harmonize so
        composite looks real
    } else if (replace_task == OBJECT_REPLACEMENT) {
        // replace object X with object Y (no demo yet for this case)
        SX = ImageSelect(I,X); // select region described by text X (e.g. "the
        man")
        J = ImageSearch(Y); // find image(s) with object Y
        SY = ImageSelect(J,Y); // select the object Y in image J
        OBJnew = ImageCut(J,SY); // get the new object Y to paste
        into I to replace X  K = ImageFillHole(I,SX); // fill the hole
        containing object X in image I
        L = ImagePaste(K,OBJnew,SX); // paste the object Y into image
        K near region SX  Iout = ImageHarmonize(L); // harmonize so
        composite looks real
    } else { throw error("Not implemented yet"); }
}
// ImageRemove(I,X): Remove X from image I
function Iout = ImageRemove(I,X) {
    SX = ImageSelect(I,X); // uses selection method for a text input description X
    (e.g. "the man") Iout = ImageFillHole(I,SX); // fill the hole indicated by mask
    SX; use Content or Stock-Aware Fill
}
```

TABLE 1-continued

Pseudo-Code Parameterized From An Editing Query

```
// ImageSelect(I,X): Select the region specified by X within image I;
// outputs: SX is the mask for region X; F is decontaminated foreground color; B is
background color function [SX,F,B] = ImageSelect(I,X) {
    If (is_background(X))           SX = SelectBackground(I);
    else if (is_sky(X))             SX = SelectSky(I);
    // else if (is_...(X))          SX = Select...(I);
    else                            SX = SelectByTextDescription(I,X);
    [SX,F,B] = ImageMatting(I,SX);  // run image matting to refine to capture
    softness like hair
}
```

In the pseudo-code in Table 1, functions are in bold, and are parameterized by objects of the editing query determined by language module 148. Hence, a directed user conversation can be directly mapped by language module 148 to remove and replace functions that generate a plurality of harmonized images.

A determination of whether an editing query includes a remove request or replace request generated by language module 148, along with any suitable information, such as a parameters of an editing query (e.g., details of what to replace an object with that might indicate suitable replacement material to obtain), lists of words generated from subject-object pairs, tables of synonyms of words in an editing query, indicators of slang or degenerate words, and the like, used by or calculated by language module 148 are stored in language data 132 of storage 126 and made available to modules of image enhancement application 120.

Image search module 150 is representative of functionality configured to obtain images that can be used to enhance an image to be edited, such as image to be edited 106. Accordingly, images obtained by image search module 150 can include fill material, replacement material, or combinations thereof. Fill material is material from an image to fill a hole created when an object is removed from an image to be edited according a remove request. In one example, fill material is obtained from harmonized image 112 or image to be edited 106 (e.g., from the image being enhanced itself). Replacement material is material from an image to replace an object according to a replace request. In one example, fill material is recognized as similar to different pixels of an image to be edited than the pixels corresponding to an object to be removed from the image to be edited. For instance, when removing a fire hydrant from a lawn, the fill material may be similar to pixels of the lawn, but not similar to the fire hydrant. Additionally or alternatively, replacement material can be recognized as similar to pixels corresponding to an object to be removed from an image to be edited (e.g., when replacing a boring sky with a cloudy sky, pixels of the cloudy sky are recognized as similar to the boring sky because they represent skies). Moreover, the replacement material corresponds to a replace request. Continuing the example, the replacement material represents a cloudy sky rather than a boring sky.

Image search module 150 therefore receives any suitable information and instruction to obtain images including fill material or replacement material. In one example, image search module receives lists of objects from language module 148, and constructs search queries for images based on the lists of objects. For instance, a search query can include forming a query string including combinations of words from a user conversation with synonyms of other words from the user conversation, such as by forming a search string from the combination of "semi-truck, freightliner" for the editing query including the replace request "Replace the Peterbilt lorry with a Freightliner", where semi-truck is a synonym for lorry.

Image search module 150 has access to images managed by image gallery module 142 to obtain images with fill material or replacement material. Furthermore, image search module 150 may use transceiver module 140 to obtain any suitable image from any suitable source, including obtaining images from a user's directory of files on computing devices 104 or server 116, obtaining images from a user's photo gallery (e.g., an on-line photo sharing service, images stored in a user's image editing application, such as Photoshop®), images a user has posted in a social media post, blog, on-line comment, and the like, images a user has attached to an email, text, or other communication sent from or received by computing devices 104, images provided by a search service, such as an on-line search for similar images to harmonized image 112, images obtained from a database of stock images, images provided by user 102, such as an image that user 102 may have that is similar to image to be edited 106, and the like. Hence, image search module 150 obtains images other than image to be edited 106 that can be used to enhance image to be edited 106, such as by adding fill material or replacement material from an image obtained by image search module 150.

In one example, one or more images including fill material obtained by image search module 150 are obtained based on a search of images using words of a first part of a string that contains words of the string related to a subject portion of subject-object pairs of the string, and one or more images including the replacement material obtained by image search module 150 are obtained based on a search of images using words of a second part of the string that contains words of the string related to an object portion of the subject-object pairs. The first part and second part of the string can be provided by language module 148. A prescribed number of images (e.g., one hundred) can be returned by image search module 150 based on the search, such as the top N images (e.g., top 100 images), or top x % (e.g., top ten percent of images).

Images obtained by image search module 150, along with any suitable information, such as search strings, statistics of search results returned, and the like, used by or calculated by image search module 150 are stored in image data 138 of storage 126 and made available to modules of image enhancement application 120.

Compositing module 152 is representative of functionality configured to enhance an image to be edited by compositing fill material, replacement material, or combinations thereof with an image to be edited. Responsive to an editing query including a remove request, compositing module 152 removes content from pixels of an image to be edited (e.g., corresponding to an object to be removed), and adds fill material to the pixels of the image to form one or more composite images. Hence, fill material is used to fill a hole when an object is removed. Content removed from an image to be edited is stored in remove data 134 of storage 126. Fill material can be included in one or more images obtained by image search module 150. Additionally or alternatively, fill material can be included in the image to be edited itself. Consequently, compositing module 152 can produce a plurality of composite images, each of which include fill material from a different image, a same image, or combinations thereof. In one example, intermediate results are presented in a user interface showing a plurality of different fill materials. A user can select which option (e.g., by speech, touching a touchscreen, clicking with a mouse, or combinations thereof) to use for fill material in an image to be edited.

Moreover, responsive to an editing query including a replace request, compositing module 152 replaces content of pixels of an image to be edited (e.g., corresponding to an object to be replaced) with replacement material to form one or more composite images. Content replaced in an image to be edited is stored in replace data 136 of storage 126. Replacement material can be included in one or more images obtained by image search module 150. Additionally or alternatively, replacement material can be included in the image to be edited itself (e.g., a user may wish to duplicate an object in an image).

Compositing module 152 can composite fill material and replacement material with an image to be edited in any suitable way. In one example, compositing module 152 receives an instruction from language module 148 indicating a function of image editing (e.g., remove or replace) and images with fill material or replacement material from image search module 150. Based on objects and data indicated by vision module 146 (e.g., segmented pixels, masks, and the like), compositing module 152 composites the fill material or replacement material according to the editing query to produce a plurality of composite images.

Additionally or alternatively, compositing module 152 can remove contributions to pixels from a background of an image to be edited, in a process referred to as background decontamination. For instance, a region bounded by a boundary of an object mask may be formed (e.g., in vision module 146) by dilating the object mask. Within this region, a percentage of a pixel may be attributed to the object, and a remaining percentage attributed to the background. As an example, consider a finely detailed object, such as brown hair in front of a blue background. For each pixel of hair in a region, a percentage of the pixel is attributed to the brown hair (e.g., 70%) and the remaining percentage (e.g., 30%) is attributed to the blue background. The contribution from the background (30% blue in this example) can be removed from the pixel, thus preventing a halo effect in the composite image.

In one example, a compositing module specific to an object removed or replaced in an image to be edited is used by compositing module 152 to form composite images. For instance, a compositing module specific to a sky object, such as a sky compositing module including a neural network trained to composite skies with training images including different skies, is used when forming a composite image in which a sky is replaced.

Composite images generated by compositing module 152, along with any suitable information, such as a ranking of the composite images determined by compositing module 152 according to a best fit of compositing, content removed, content replaced, contributions of content (e.g., the background) removed from pixels, and the like, used by or calculated by compositing module 152 are stored in storage 126, such as in image data 138, and made available to modules of image enhancement application 120.

Harmonizing module 154 is representative of functionality configured to harmonize a composite image to form a harmonized image that looks natural and removes artifacts of image editing, including removing an object and replacing an object in an image. Harmonizing module 154 can harmonize a composite image in any suitable way to make it look natural and unedited. For instance, harmonizing module 154 can adjust the lighting locally or globally in an image. In one example, lighting is adjusted in one portion of a composite image (e.g., in replacement material) to make it match the lighting in another portion of the composite image. The lighting may be adjusted to account for different times of day between the replacement material and an image to be edited, and thus may adjust shadows and highlights in a harmonized image to match times of day.

Additionally or alternatively, harmonizing is performed by a harmonization module specific to an object removed or replaced in an image to be edited. For instance, a harmonization module specific to a bicycle object, such as a bicycle harmonizing module including a neural network trained to harmonize bicycle with training images including different bicycles, is used when harmonizing a composite image in which a bicycle has been replaced.

Harmonizing module 154 may also perform background decontamination, in which contributions of a background of an image to pixels in a region are removed from the pixels, as discussed above.

Harmonized images generated by harmonizing module 154, along with any suitable information, such as parameters of harmonizing algorithms, indicators of neural networks used, indicators of regions in which harmonization is done, and the like, used by or calculated by harmonizing module 154 are stored in storage 126, such as in image data 138, and made available to modules of image enhancement application 120.

Display module 156 is representative of functionality configured to expose images of image enhancement system 110 in a user interface. A user interface can be displayed on display 122 of computing device 104. (An example user interface is discussed below in more detail in regards to FIG. 5.) Display module 156 can expose any suitable image in a user interface, including images obtained by image search module 150, composite images generated by compositing module 152, harmonized images generated by harmonizing module 154 (e.g., harmonized image 112), an image to be edited (e.g., image to be edited 106), intermediate images (e.g., images with indicators of objects segmented by vision module 146), combinations thereof, and the like.

Having considered an example digital medium environment, consider now a discussion of example flow diagrams of images in accordance with aspects of removing and replacing objects in an image.

Example Images

Figure 2:
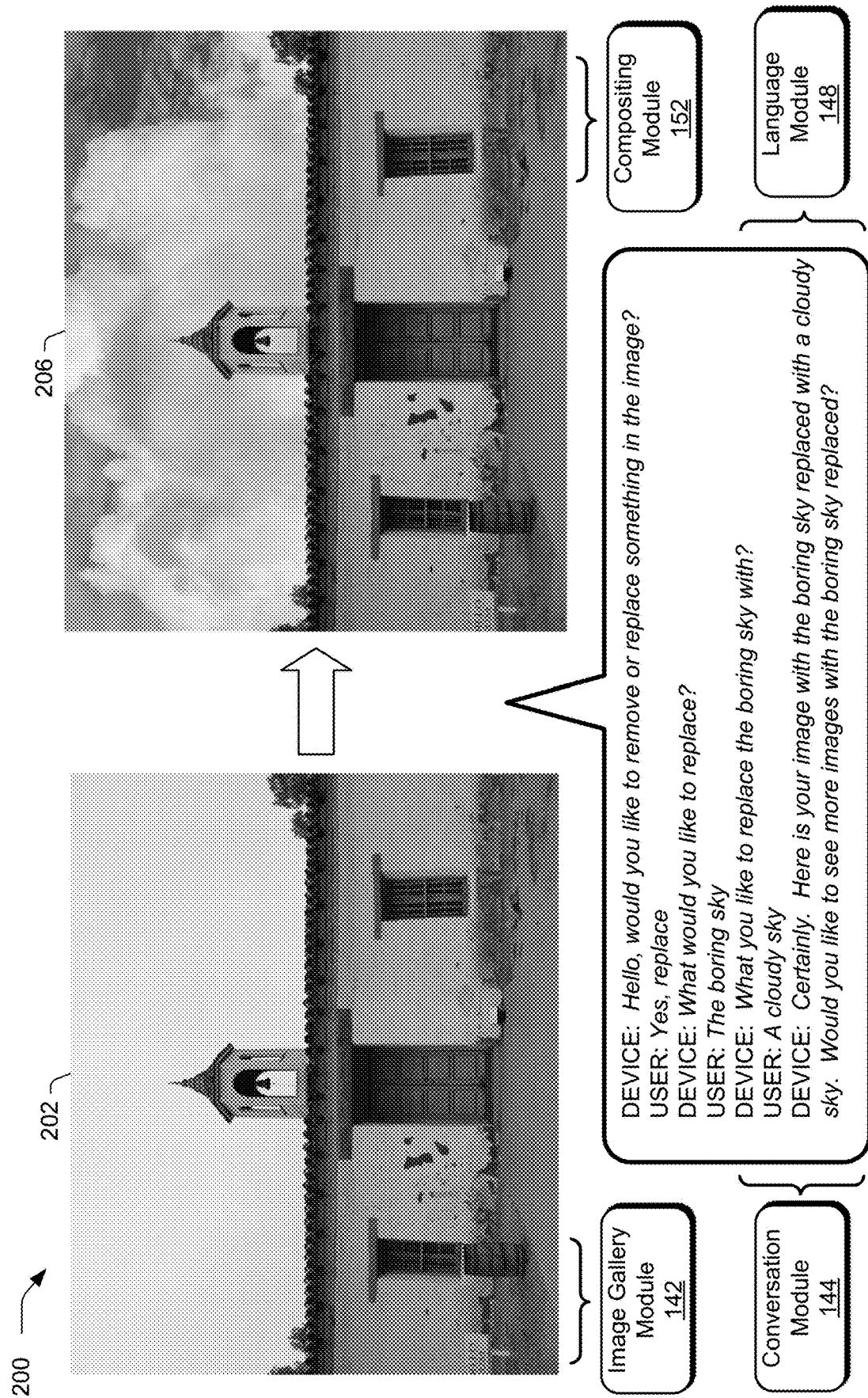
FIG. 2 illustrates an example flow diagram of images corresponding to a replace request in accordance with one or more aspects of the disclosure.

FIG. 2 illustrates an example flow diagram 200 of images corresponding to a replace request in accordance with one or more aspects of the disclosure. Flow diagram 200 includes an image to be edited 202, a directed user conversation 204 (indicated in a conversation bubble) between a device and a user (e.g., one of computing devices 104 and user 102 in FIG. 1, respectively), and a harmonized image 206. Directed user conversation 204 is an example of user conversation 108 in FIG. 1, and harmonized image 206 is an example of harmonized image 112 in FIG. 1. Hence, the image to be edited 202 may be obtained from, or in coordination with, image gallery module 142, directed user conversation 204 may be directed by conversation module 144 in conjunction with language module 148, and harmonized image 206 may be generated by harmonizing module 154 of FIG. 1.

Directed user conversation 204 can be initiated in any suitable way. In one example, directed user conversation 204 is initiated in response to the image to be edited 202 being flagged for editing, such as by a user selecting the image to be edited 202 for editing, the image to be edited 202 being loaded into an image editing application (e.g., image enhancement application 120), and the like. Directed user conversation 204 is in a question and answer interview format, in which a device (e.g., one of computing devices 104 in FIG. 1) asks questions, and a user (e.g., user 102 in FIG. 1) answers.

In directed user conversation 204, a device asks "Hello, would you like to remove or replace something in the image?", to which the user responds "Yes, replace". The device directs the conversation by asking "What would you like to replace?", to which the user answers "The boring sky". The device again directs the conversation by narrowing the parameters of the replacement task, and asks "What would you like to replace the boring sky with?" By including the object to be replaced (e.g., the boring sky) in the question to the user, the device offers an implicit offer for confirmation from the user. For instance, if the user responds to correct the device, by saying something like "I didn't say boring sky, I said 'berry pie'", the device has implemented an efficient means of correction, since no explicit query dedicated to asking for correction was needed. As a result, if the user does not respond to correct the device, the device surmises with a high degree of certainty that "boring sky" is correctly identified from the user conversation. Hence, conversation module 144 and language module 148 in FIG. 1 can work together during the course of a directed user conversation.

Continuing with the example directed user conversation 204 in FIG. 2, the user responds "A cloudy sky", indicating to the device that the boring sky should be replaced by a cloudy sky. In response, the device generates harmonized image 206, which includes a cloudy sky. Harmonized image 206 includes is natural looking and lacks artifacts of editing often present in composite images, such as halos.

Figure 3:
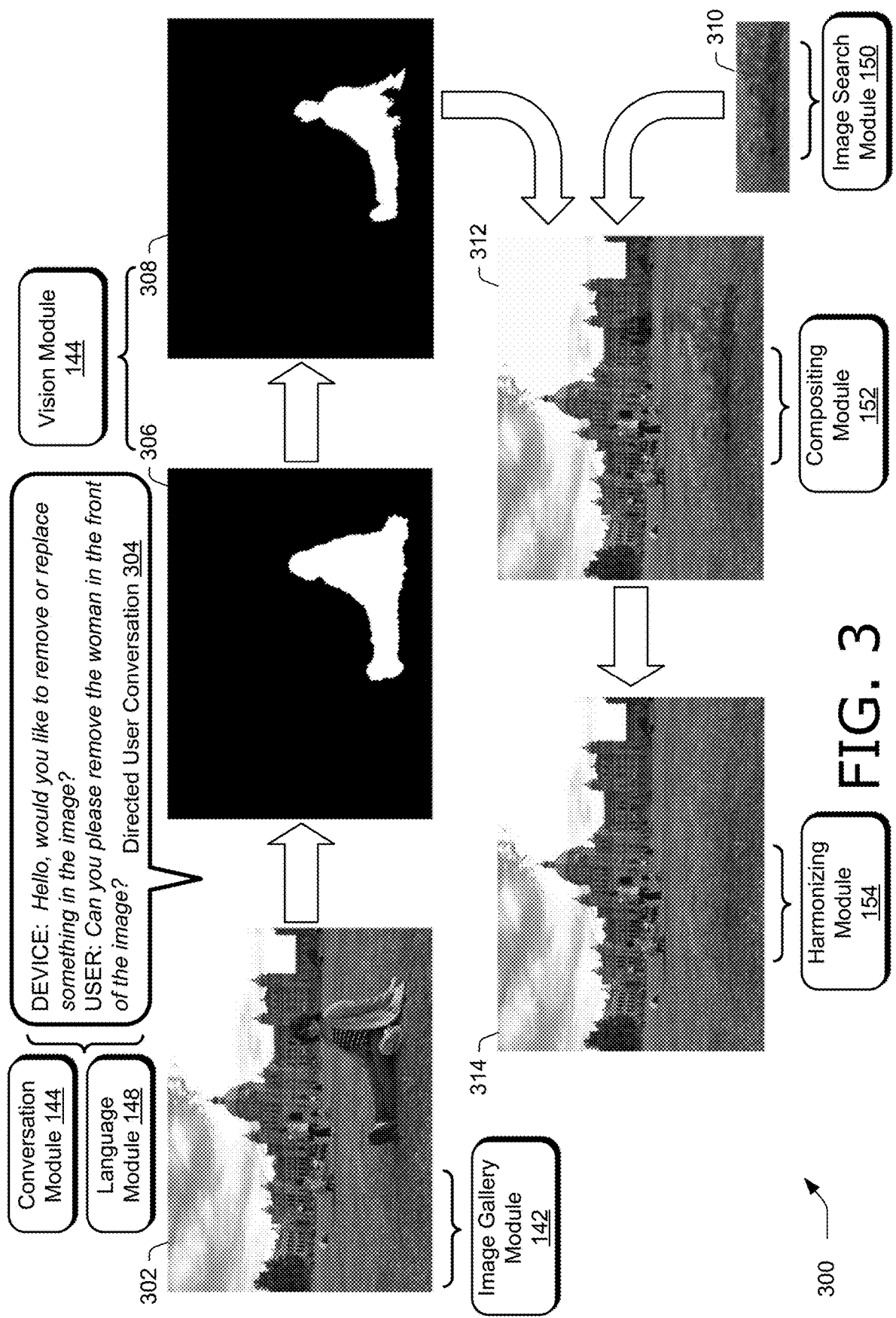
FIG. 3 illustrates an example flow diagram of images corresponding to a remove request in accordance with one or more aspects of the disclosure.

FIG. 3 illustrates an example flow diagram 300 of images corresponding to a remove request in accordance with one or more aspects of the disclosure. Though the example in FIG. 3 describes images for a remove request, images of FIG. 3 are also applicable to other editing functions, such as a replace request, a move request (to move an object within an image), a duplicate request (to duplicate an object in an image), an add request (to add an object to an image), and the like.

The example flow diagram 300 in FIG. 3 includes an image to be edited 302, a directed user conversation 304, an object mask 306, a refined mask 308, fill material 310, a composite image 312, and a harmonized image 314. In one example, the image to be edited 302 is obtained by image gallery module 142, and may be part of a user's library of images associated with an image editing application. The fill material can be included in an image obtained from image search module 150, from the image to be edited 302, from an image managed by image gallery module 142, or combinations thereof.

Directed user conversation 304 includes a conversation between a device and a user (e.g., one of computing devices 104 and user 102 in FIG. 1, respectively), and is an example of user conversation 108 in FIG. 1. Moreover, directed user conversation 304 may be directed by conversation module 144 in conjunction with language module 148, as previously described. Furthermore, harmonized image 314 is an example of harmonized image 112 in FIG. 1, and harmonized image 314 may be generated by harmonizing module 154 of FIG. 1. Object mask 306 and refined mask 308 are examples of masks generated by vision module 146.

In the example in FIG. 3, directed user conversation 304 includes a question by a device "Hello, would you like to remove or replace something in the image?" Additionally or alternatively, the device can ask about any suitable editing function, such as to move, duplicate, add, or make opaque an object. A user responds to the question with an editing query "Can you please remove the woman in the front of the image?"

Vision module 146 ascertains pixels of the image to be edited 302 corresponding to "the woman in the front of the image". Because vision module 146 has semantic understanding of the image, it is able to accurately determine which woman in the image is the woman in the front of the image. Accordingly, vision module 146 generates object mask 306 for the object "the woman in the front of the image". Object mask identifies a rough set of pixels corresponding to the object, without including content of the image. For instance, pixels of an object mask may be binary colors, indicating inclusion or exclusion in the object mask. In the example object mask 306, white pixels are included in the object mask and black pixels are excluded from the object mask.

Based on object mask 306, vision module 146 generates refined mask 308. A refined mask can be generated from an object mask by dilating the object mask to create a region bounded by a boundary of the object mask. For instance, the boundary of white and black in object mask 306 may be dilated towards the interior of the white pixels to form a region of constant width bounded by the boundary (e.g., an interior region of the object mask). Within this region, or any suitable region, the background of the image is further separated from a foreground of the image, such as by applying a neural network trained at separating backgrounds from foregrounds in a region of an object mask to refine the object mask. By further separating the background from the foreground in a region of object mask 306, refined mask 308 is generated that more accurately defines pixels representing the object (e.g., the woman in the front of the image) than object mask 306.

The refined mask 308 and fill material 310 are used by compositing module 152 to generate composite image 312. In composite image 312, content of the pixels corresponding to the object (e.g., the woman in the front of the image) has been removed. To fill a hole in the image caused by removing the content, fill material 310 has been added to the pixels corresponding to the object in composite image 312, e.g., the pixels associated with refined mask 308. Compositing the fill material may include performing background decontamination, where in a region, such as the region described above used to create refined mask 308 from object mask 306, contributions to pixels of a background of the image are removed from the pixels. Thus halos in composite image 312 are reduced.

However, some artifacts of compositing may still remain in composite image 312. In the example in FIG. 3, an outline of the added fill material in composite image 312 can be detected to a critical observer. Consequently, harmonizing module 154 generates harmonized image 314. Harmonized image 314 is produced by harmonizing composite image 312 to make the image look natural and remove artifacts of the object removal task. In the example in FIG. 3, a neural network trained specifically on harmonizing objects corresponding to persons has been used to reduce artifacts of the object removal to levels undetectable to most observers.

Having considered example flow diagrams of images, consider now a discussion of an example system usable to remove and replace objects in an image to be edited.

Example Image Enhancement System

Figure 4:
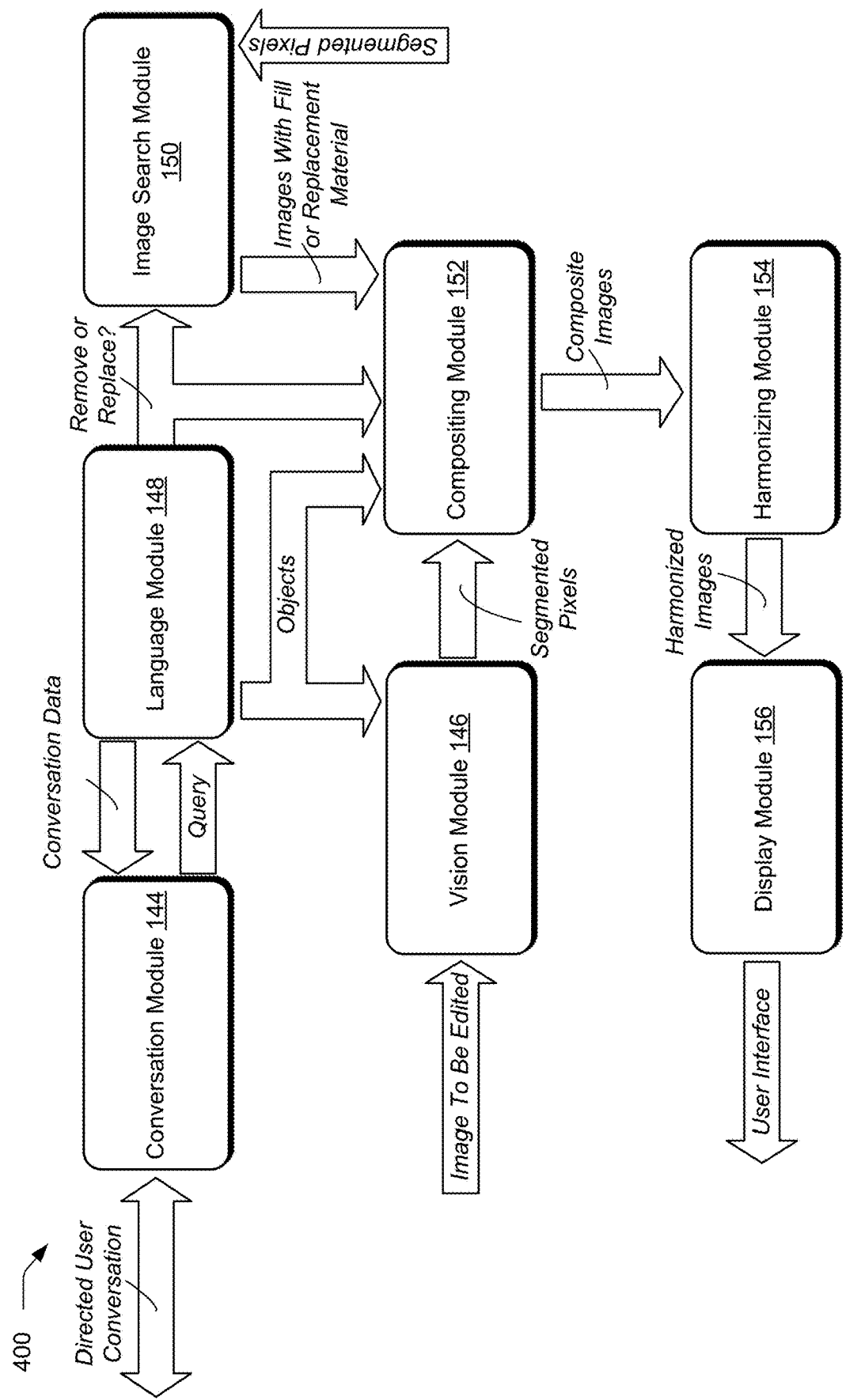
FIG. 4 illustrates an example system usable to replace and remove objects in an image in accordance with one or more aspects of the disclosure.

FIG. 4 illustrates an example system 400 usable to remove and replace objects in an image to be edited in accordance with one or more aspects of the disclosure. In this implementation, system 400 includes the modules of image enhancement application 120 as described in FIG. 1, e.g., conversation module 144, vision module 146, language module 148, image search module 150, compositing module 152, harmonizing module 154, and display module 156. System 400 is one example of image enhancement system 110 that can be constructed using the modules of image enhancement application 120. For instance, signals can be redefined, and modules can be modified, combined, divided, added, or removed to form a modified system, without altering the functionality of system 400. Accordingly, such modified systems are considered to be within the scope of the disclosure.

Furthermore, for simplicity system 400 is limited to the modules of image enhancement application 120 and a description of some of their interconnects. System 400 can, however, include any suitable signals and communications between modules omitted for simplicity. Such signals may include system clocks, counters, image indicators, object indicators, reset signals, and the like. In one example, system 400 can operate automatically and without user intervention once a directed user conversation is completed. Furthermore, system 400 can operate in real time (e.g., with no perceptible delay to a user once a user conversation is completed). Accordingly, signals can be calculated by the modules of system 400 and communicated between the modules of system 400 without significant delay, so that at least one harmonized image can be generated and exposed without perceptible delay to a user. For instance, system 400 can preemptively obtain images with fill material or replacement material and generated harmonized images during a directed user conversation based on parameters extracted from the directed user conversation, so at least one harmonized image is exposed during or immediately after the directed user conversation. As more harmonized images are generated, system 400 can append newly generated harmonized images to expose harmonized images in a user interface.

Moreover, system 400 can be implemented on any suitable device or devices. In one example, system 400 is implemented on one computing device (e.g., one of computing devices 104 in FIG. 1). In another example, system 400 is implemented on more than one computing device. For instance, parts of system 400 can be implemented by a first computing device, such as computing device 104-1 in FIG. 1, and other parts of system 400 can be implemented by an additional computing device or devices, such as computing device 104-2. In one example, a server implements parts of system 400, such as server 116 in FIG. 1. A server can be remote, e.g., because it is not collocated with the first computing device. A server may be configured to receive signals of system 400 from a computing device (e.g., one or more of computing devices 104), process the received signals, such as with image support system 118, and transmit results of the processing back to the computing device. Hence, image support system 118 of server 116 in FIG. 1 may include system 400.

Additionally or alternatively, parts of system 400 can be implemented by an additional computing device that is collocated with a first computing device. For instance, one of computing devices 104 may be a first computing device, and another of computing devices 104 may be an additional, collocated computing device. The first computing device and the additional computing device may be operated by one or more users. Hence, system 400 provides for multiple users within an environment to share data included in system 400. For instance, an image to be edited can be obtained by a first computing device operated by a first user, and sent to another computing device operated by a second user. The second user can then select an image with fill material for an object to be replaced in the image to be edited (e.g., a background), and send the image with the fill material back to the first user and the first computing device. The first computing device can then use the image with the fill material selected by the second user to form a harmonized image. The harmonized image can then be shared with other users, such as the second user.

Conversation module 144 directs a user conversation (e.g., a directed user conversation). In one example, conversation module 144 directs the user conversation in a question and answer, interview-style conversation. Based on the directed user conversation, conversation module 144 provides a query (e.g., an editing query) to language module 148. A query can include a request for a function to edit an image, such as a remove request, a replace request, a move request, a duplicate request, an add request, and the like. A query can be provided by conversation module 144 at any suitable time, such as during a directed user conversation, after a directed user conversation, or both during and after a directed user conversation. Thus, a query provided by conversation module 144 can include any number of queries, and be of any suitable format. For instance, a query provided by conversation module 144 may include one or more recordings of a directed user conversation, a transcript of a directed user conversation, a data structure with fields populated by words and indicators of words in a directed user conversation, combinations thereof, and the like.

Furthermore, conversation module 144 receives conversation data from language module 148. Conversation data received from language module 148 can be any suitable data regarding a directed user conversation, generated based on a query provided from conversation module 144. For instance, conversation data may include indicators of questions to ask in a directed user conversation (e.g., based on a database search conducted by image search module 150 to determine availability of images related to the directed user conversation, during the directed user conversation), requests for confirmation (e.g., to confirm selection of an object in an image), and the like. Hence, conversation module 144, language module 148, and image search module 150 can work together during a directed user conversation to direct the directed user conversation.

Language module 148 receives a query from conversation module 144 and processes the query to determine parameters of the query, including what editing-function request is included in the query (e.g., remove request, a replace request, a move request, a duplicate request, an add request, and the like). In one example, language module 148 determines whether a query from conversation module 144 includes a remove request or a replace request.

Furthermore, language module 148 identifies one or more objects based on a query received from conversation module 144. An object identified by language module 148 can an object to be replaced, an object to be removed, an object to be duplicated, an object to be moved, an object to add to an image, and object to replace an object in an image to be edited, combinations thereof, and the like. Examples of objects identified from language module 148 include animate and inanimate objects, a background, a sky, artifacts of the imaging process (e.g., specular reflections, pixelization, lens distortion, spots, etc.), and the like.

Language module 148 provides objects identified from a query to vision module 146, including indicators of editing-function requests included in or indicted by the query (e.g., an indicator of whether the query includes a remove request or a replace request) to image search module 150 and compositing module 152.

Vision module 146 receives an image to be edited, such as an image provided by a user and loaded into storage 126 in image enhancement system 110 in FIG. 1. Vision module 146 also receives objects identified from a query from language module 148. Vision module 146 identifies and ascertains pixels of an image to be edited that correspond to the objects identified by language module 148. Vision module 146 can ascertain pixels corresponding to objects in any suitable way. In one example, vision module 146 generates one or more masks for objects identified by language module 148. A mask can describe a shape of an object without including content from the image to be edited. Vision module 146 can generate an object mask for an object, and from the object mask generate a refined mask by dilating the object mask to create a region bounded by a boundary of the object mask and separating a background from a foreground for pixels in the region.

Vision module 146 can use a neural network to identify pixels of an image corresponding to an object that has been trained specifically for the type of object to be identified. Hence, when identifying a dog in an image, vision module 146 may select a neural network from a plurality of available neural networks that has been trained to identify dogs in images using training images containing different breeds of dogs.

Additionally or alternatively, vision module 146 can ascertain pixels of an image corresponding to an object identified by language module 148 by determining a set of inverse pixels that do not include the pixels corresponding to the object, and then determining the pixels corresponding to the object from the set of inverse pixels.

Furthermore, vision module 146 has semantic understanding of an image to be edited, and thus is able to distinguish between similar objects in an image. For instance, for an image containing a plurality of bookshelves, vision module 146 is able to distinguish a corner bookshelf from an object description indicating "the bookshelf in the corner".

Pixels corresponding to objects that are ascertained by vision module 146 are provided to compositing module 152 and image search module 150. Segmented pixels provided by vision module 146 can be in any suitable format and include any suitable data, such as masks, object indicators (e.g., numbers to denote objects among a plurality of objects), replace or remove indicators, a copy of the image to be edited, and the like.

Image search module 150 receives data about an editing query from language module 148, including an indicator of whether the query includes a remove request or a replace request. Data received from language module 148 can include any suitable data regarding an editing query, such as descriptions of objects identified from a query and synonyms of objects that can be used by image search module 150 to conduct a query string for an image search (e.g., to search a database of stock images, an on-line search, a search of a computing device, and the like).

Image search module 150 also receives segmented pixels from vision module 146. In one example, image search module constructs a query string for an image search by analyzing content of segmented pixels provided by vision module 146. For instance, image search module 150 may analyze the segmented pixels to narrow a query string by including descriptors of the segmented pixels, and thus obtain a better matching fill material or replacement material. As an example, image search module 150 may analyze segmented pixels from vision module 146 that contain lawn grass, and determine that the type of lawn grass is bluegrass. Consequently, vision module 146 may construct a search string from combinations of the words "lawn", "grass", and "bluegrass".

Image search module 150 obtains one or more images including fill material or replacement material. Image search module 150 obtains images from any suitable sources, such as a database of images, a user gallery of images, files on a computing device, and the like, as described above.

In one example, image search module 150 obtains images based on an indicator of whether an editing query includes a remove request or a replace request. For instance, responsive to determining an editing query includes a replace request, image search module 150 can obtain one or more images including replacement material recognized as similar to pixels that correspond to an object identified by language module 148 that is to be replaced in an image to be edited according to the replace request.

Additionally or alternatively, responsive to determining an editing query includes a remove request, image search module 150 can obtain one or more images including fill material recognized as similar to different pixels than pixels that correspond to an object identified by language module 148 that is to be removed in an image to be edited according to the remove request. For instance, the different pixels may be similar to a background of an image from which an object (e.g., a person) is removed.

Image search module 150 provides images with fill material, replacement material, or both fill material and replacement material to compositing module 152.

Compositing module 152 receives segmented pixels from vision module 146 (e.g., including the image to be edited), an indicator of whether a query includes a remove request or a replace request from language module 148, any suitable data from language module 148, such as descriptions of objects identified from a query, and images obtained by image search module 150, and generates one or more composite images to fulfill an editing query obtained from the directed user conversation directed by conversation module 144.

In one example, compositing module 152 generates a composite image for each image provided by image search module 150 by compositing fill material or replacement material from an image provided by image search module 150 with an image to be edited provided by vision module 146. For a remove request, compositing includes removing content of segmented pixels of the image to be edited corresponding to an object to be removed. Compositing module 152 then adds content of the fill material to the pixels corresponding to the object to be removed. For a replace request, compositing module 152 replaces content of pixels of the image to be edited corresponding to an object to be replaced with replacement material.

Compositing module 152 can process fill material or replacement material in any way to composite it with an image to be edited. For instance, compositing module 152 can extract fill material or replacement material from an image obtained by image search module 150, filter the material (e.g., adjust color, brightness, contrast, apply a filter, and the like), re-size the material (e.g., interpolate between pixels of the material, decimate pixels of the material, or both, to stretch or squash the material), rotate the material, crop the material, composite the material with itself or other fill or replacement material, and the like.

Compositing module 152 provides one or more composite images to harmonizing module 154. Harmonizing module 154 receives composite images from compositing module 152 and generates harmonized images from the composite images. Though not shown in FIG. 4, harmonizing module 154 can receive any other suitable data generated by or used by system 400, such as identifiers of objects from language module 148, segmented pixels from vision module 146, and the like.

Harmonizing module 154 harmonizes composite images provided by compositing module 152 in any suitable way. In one example, harmonizing module 154 produces a harmonized image for each composite image received by compositing module 152 by removing compositing artifacts in the composite images, such as mismatches in light, adjusting or removing shadows, blending replacement or fill material, performing background decontamination, and the like. Additionally or alternatively, harmonizing module 154 may harmonize a composite image with a neural network trained specifically for the type of object removed from or replaced in an image to be edited used to form the composite image, a background of the image to be edited, or combinations thereof. For instance, harmonizing module 154 can use a neural network trained to harmonize persons in a beach scene when removing or replacing a person in an image with a beach scene. Here, the person is an object to be replaced or removed, and the beach scene is a background of the image to be edited. Harmonized images generated by harmonizing module 154 are provided to display module 156.

Display module 156 receives harmonized images from harmonizing module 154. Additionally or alternatively, display module 156 receives any suitable images used by or generated by system 400, such as an image to be edited obtained by vision module 146, images with fill material or replacement material obtained by image search module, intermediate images (e.g., an image generated by vision module 146 including an indicator, such as a lasso, enclosing box, shading, pattern, etc., of an object in an image indicated by language module 148), and the like. Display module 156 exposes images in a user interface (discussed in more detail below).

By exposing any suitable image, mask, object, pixels, query, and the like, display module 156 can expose any result of system 400 (e.g., intermediate or completed results) and prompt a user for feedback. For instance, display module 156 may display a mask generated by vision module 146 and prompt a user to correct the mask (e.g., move a border of the mask) or confirm that the mask is correct (e.g., what the user intended). Additionally or alternatively, display module 156 can expose parameters used by system 400, such as parameters of a harmonization process used by harmonizing module 154, allowing a user to adjust the parameters. For instance, a user may adjust a brightness of a brightness parameter used to produce a harmonized image.

In one example, a user may adjust a border of a background segmentation generated by vision module 146, such as by moving a water line separating a beach and ocean that defines a background scene of an image.

Furthermore, display module 156 exposes harmonized images from harmonizing module 154 in an order according to a score assigned to the harmonized images. The score can be assigned in any suitable way, such as by compositing module 152 or harmonizing module 154, based on the compositing, harmonizing, or both. In one example, the score is based on a level of processing resources (e.g., number of editing functions, number of processor instructions, number of clock cycles, number of iterations of an algorithm, combinations thereof, and the like) consumed or expended to perform the compositing or harmonizing by compositing module 152 or harmonizing module 154, respectively. Scores can be generated separately for compositing and harmonizing, and used separately or in combination to generate an order used by display module 156 to expose the harmonized images.

System 400 constitutes an improvement over systems that manually remove or replace an object in an image to be edited without the benefit of a directed user conversation. System 400 generates multiple solutions satisfying a replace request or a remove request automatically and without requiring a high level of training by a user. Even neophyte users can generate naturally-looking harmonized images that remove or replace an object in an image without relying on another party, such as an on-line photo editing service, or a friend who knows how to use Adobe's Photoshop® like an expert. A user merely needs to provide an image to be edited and participate in a directed conversation with a computing device to obtain harmonized images that remove or replace an object in the image. Accordingly, a user can generate many naturally-looking harmonized images quickly, cheaply, and with little effort and delay compared to systems that manually remove or replace an object in an image to be edited without the benefit of a directed user conversation. Furthermore, by receiving multi-modal user input during a directed user conversation, system 400 is reliable compared to other systems (e.g., it correctly interprets a user's commands when other systems fail), and thus a user of system 400 is less frustrated than a user of other systems that do not receive multi-modal user input during a directed user conversation.

Having considered an example system 400, consider now a discussion of an example user interface in accordance with one or more aspects of the disclosure.

Example User Interface

Figure 5:
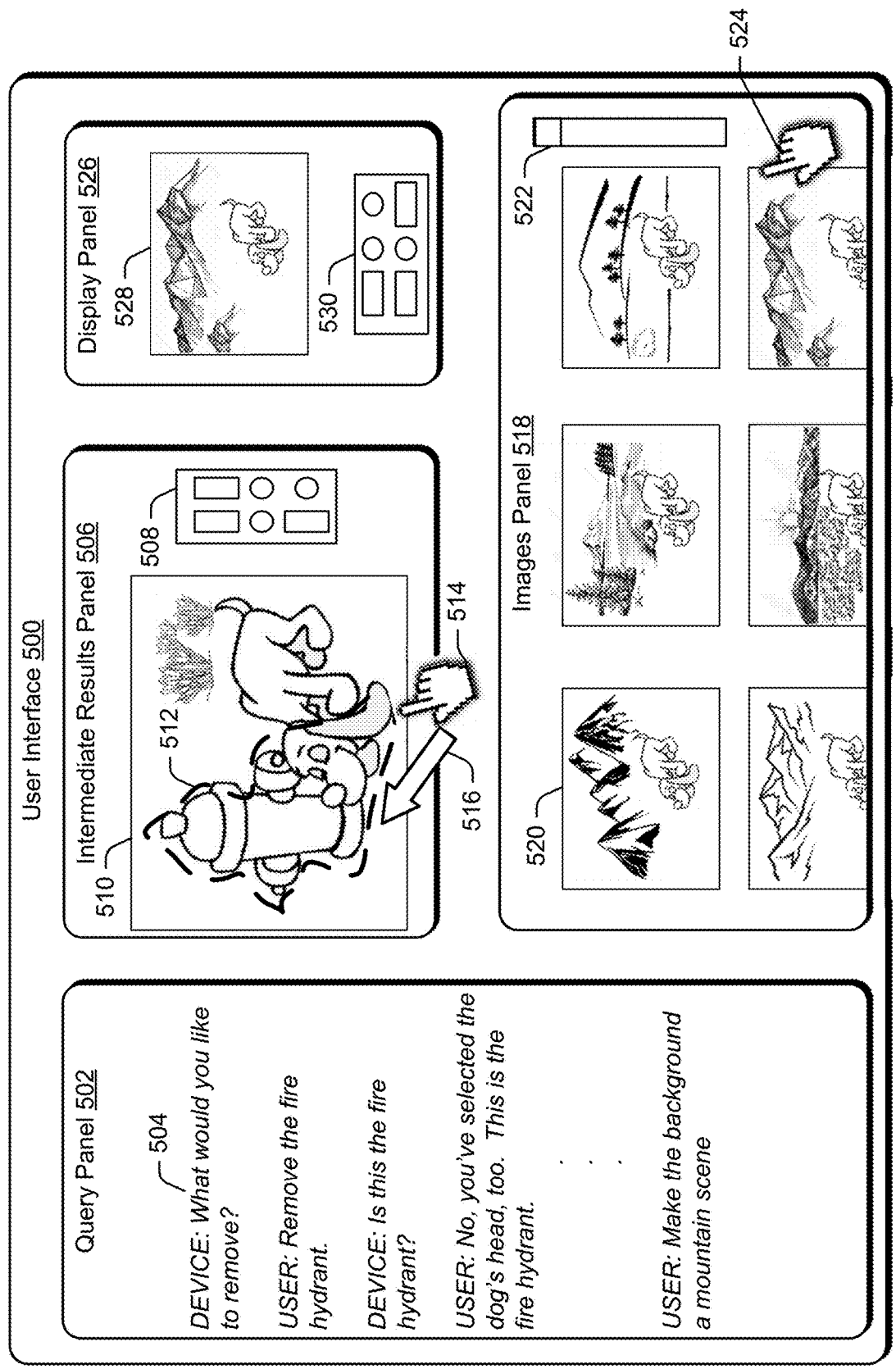
FIG. 5 illustrates an example user interface in accordance with one or more aspects of the disclosure.

FIG. 5 illustrates an example user interface 500 in accordance with one or more aspects of the disclosure. In FIG. 5, the example user interface 500 includes four data panels, discussed below. However, user interface 500 can include any suitable number and type of data panels to display data, images, and the like. User interface 500 is an example of a user interface generated by system 400 in FIG. 4 and displayed on display 122 in FIG. 1. Hence, a device displaying user interface 500 can be any suitable device, such as one of devices 104 in FIG. 1.

User interface 500 includes query panel 502 that includes a representation 504 of a directed user conversation between a device (e.g., one of devices 104 in FIG. 1) and a user (e.g., user 102 in FIG. 1). The directed user conversation indicated by representation 504 is an example of user conversation 108 in FIG. 1.

User interface 500 also includes intermediate results panel 506. Intermediate results panel 506 includes controls 508, suitable to control an image displayed in intermediate results panel 506. Controls 508 can include any suitable control, such as adjusters for brightness, contrast, color, selection of filters, shading, crop, overlay, and the like. Furthermore, controls 508 can include controls for a user conversation, such as volume, a language of text displayed in representation 504 of a directed user conversation, mute, amount of reverberation, a bandwidth of an anti-aliasing filter for speech of the directed user conversation, sampling rate and data bit-width for the directed user conversation and the like.

Intermediate results panel 506 can display any suitable images, such as intermediate images, composite images, harmonized images, images with fill material, images with replacement material, and the like. In the example in FIG. 5, intermediate results panel 506 displays intermediate image 510 including a fire hydrant and a dog with a background of bushes. Intermediate image 510 is an example of an image generated by vision module 146 in FIG. 1 and FIG. 2. Intermediate image 510 includes an indicator 512 of an object (in this example, a candidate for the fire hydrant) in response to the directed user conversation of representation 504.

For instance, in representation 504 a device asks "What would you like to remove?" as part of the directed user conversation, which may already be in progress. Hence, "What would you like to remove?" may not be the start of the directed user conversation of representation 504. A user replies to "Remove the fire hydrant". In response to the user asking to remove the fire hydrant, user interface 500 exposes intermediate image 510 in intermediate results panel 506, and indicates a candidate object for the fire hydrant with indicator 512. Indicator 512 can be any suitable indicator, such as a lasso, circle, shading, pattern, mask, overlay, arrow, proximate text, and the like. In the example in FIG. 5, indicator 512 includes a dashed outline encompassing the fire hydrant together with the dog's head. Hence, indicator 512 does not correctly identify the fire hydrant because it also includes the dog's head. As a result of exposing intermediate image 510 with indicator 512, and querying "Is this the fire hydrant" by the device, the user responds in the directed user conversation of representation 504 "No, you've selected the dog's head, too. This is the fire hydrant".

User interface 500 receives a multi-modal user input, including speech indicated by representation 504 (e.g., "No, you've selected the dog's head, too. This is the fire hydrant") and also a selection with a tool in user interface 500. In the example in FIG. 5, the user selects indicator 512, (e.g., by pointing with a mouse and clicking a mouse button), which is denoted by a hand representation 514. The user also moves the indicator 512 to adjust content that it indicates (e.g., by holding a mouse button down and moving or adjusting indicator 512). Adjustment of indicator 512 is shown in FIG. 5 by arrow 516, such that the user may adjust indicator 512 to include the fire hydrant without including the dog's head, thereby correcting indicator 512. Any suitable selection with a tool in user interface 500 can be used to provide multi-modal user input, such as user clicking on a center of an object (e.g., clicking on the center of the fire hydrant in intermediate image 510) while speaking (e.g., "No, you've selected the dog's head, too. This is the fire hydrant" in the directed user conversation of representation 504) represents a multi-modal user input. By using multi-modal input, rather than a user having to select an object by less efficient means, such as painting over an object with a tool brush, an object in an image to be edited can be quickly and accurately identified with little effort on the user's behalf.

Continuing the example in FIG. 5, the directed user conversation of representation 504 includes an editing query from the user "Make the background a mountain scene". The device engaged in the directed user conversation of representation 504 uses an image enhancement system (e.g., image enhancement system 110 of FIG. 1 or system 400 of FIG. 4) and interprets the editing query to include a replace request to replace the background with a mountain scene. For instance, "background" is an object to be replaced, and "mountain scene" is an object to replace the object to be replaced. Accordingly, user interface 500 includes images panel 518 configured to display any suitable type of images, such as intermediate images, composite images, harmonized images, images with fill material, images with replacement material, and the like. In the example in FIG. 5, images panel 518 displays a plurality of harmonized images 520 that each include the dog of intermediate image 510 with the fire hydrant removed, and the background (e.g., bushes) replaced with a mountain scene. The mountain scenes of harmonized images 520 include fill material obtained from any suitable images, such as stock images obtained from a database of images. Harmonized images 520 can be searched and scrolled through using a scroll bar 522 of images panel 518. For instance, by sliding a control of scroll bar 522 up and down, harmonized images 520 in images panel 518 are scrolled up and down, respectively, so that different images are exposed in images panel 518.

A user selects one of harmonized images 520 in images panel 518. In FIG. 5, the selection is indicted by hand representation 524. For instance, hand representation 524 indicates that a user selects one of the harmonized images 520 in the bottom right corner as displayed in images panel 518. The selected image may correspond to a mountain scene preferred by the user.

As a result of a user selecting an image in images panel 518, an image in display panel 526 is exposed. For instance, responsive to user selecting the one of the harmonized images 520 in the bottom right corner as displayed in images panel 518 indicated by hand representation 524, harmonized image 528 is displayed in display panel 526. Note that harmonized image 528 in display panel 526 corresponds to the selected image indicated by hand representation 524 (e.g., they are the same image). In one example, display panel 526 is displayed in user interface 500 responsive to a user selection of one of the harmonized images 520 displayed in images panel 518. For instance, prior to a user selection of one of the harmonized images 520 displayed in images panel 518, display panel 526 may not be displayed in user interface 500.

Furthermore, display panel 526 includes controls 530, suitable to control an image displayed in display panel 526. Controls 530 can include any suitable control, such as adjusters for brightness, contrast, color, selection of filters, shading, crop, overlay, saving an image, a number of pixels in an image, aspect ratio, and the like. In one example, controls 530 includes a selection to export a harmonized image, e.g., harmonized image 528, so that it is sent to a computing device, such as one of computing devices 104 in FIG. 1. For instance, harmonized image 528 can be generated and displayed on a user interface of one of computing devices 104 and sent to another of computing devices 104 by a selection in controls 530. In one example, the selection requires a single user action, such as enabling a "send to friends" button that causes harmonized image 528 to be sent to a predetermined list of computing devices, persons, or combinations thereof.

Having considered an example user interface 500, consider now a discussion of example procedures for removing and replacing objects in an image to be edited in accordance with one or more aspects of the disclosure.

Example Procedures

Figure 6:
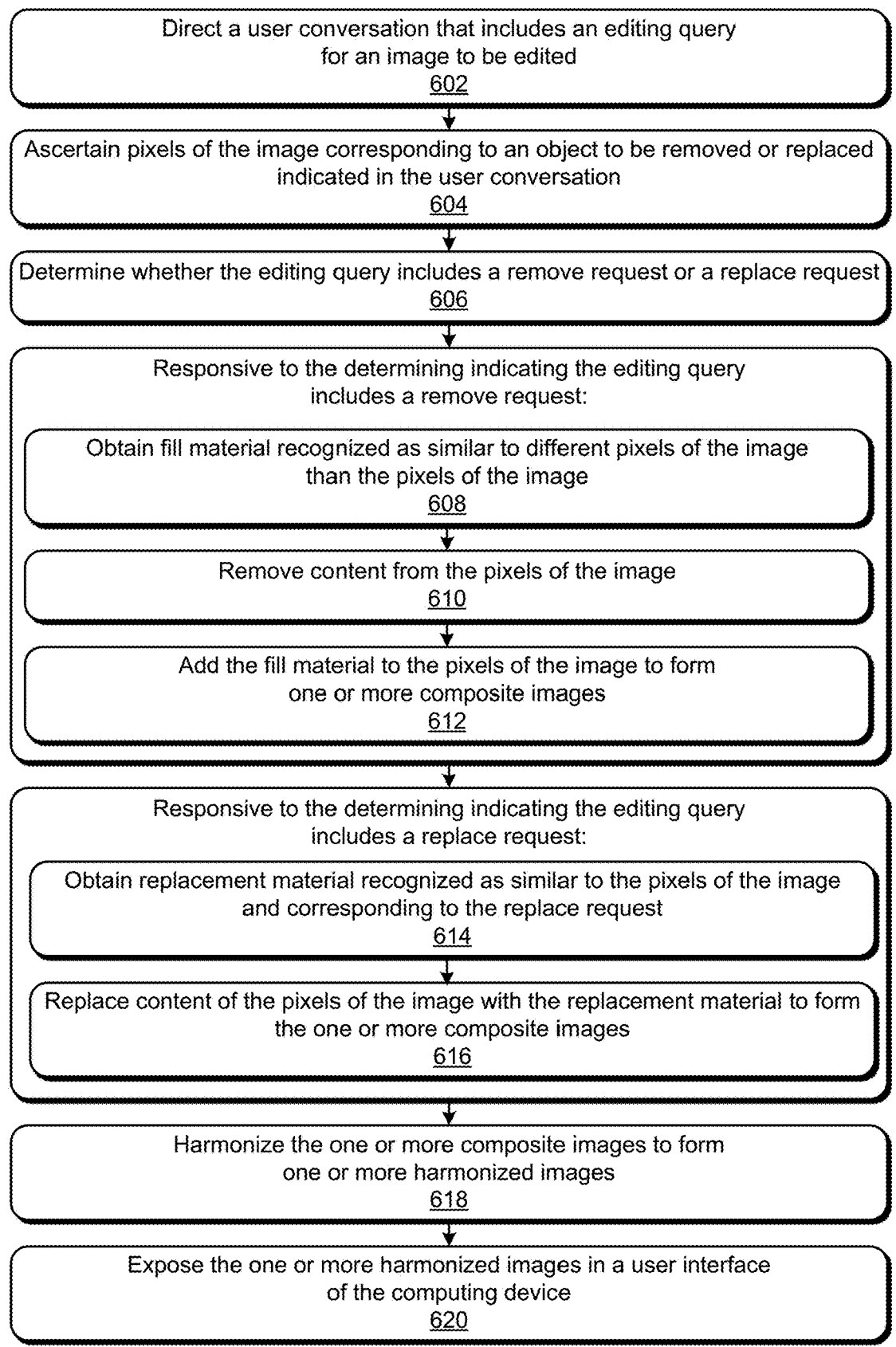
FIG. 6 illustrates a flow diagram depicting an example procedure in accordance with one or more aspects of the disclosure.

FIG. 6 illustrates an example procedure 600 for enhancing an image to be edited by removing or replacing objects in the image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 116 of FIG. 1 that makes use of an image enhancement system, such as system 400 or image enhancement system 110. An image enhancement system implementing procedure 600 may be an independent application that has been installed on the computing device, a service hosted by a service provider that is accessible by the computing device, a plug-in module to the computing device, or combinations thereof.

A user conversation is directed by a computing device (block 602). For instance, the user conversation is a directed user conversation. The user conversation includes an editing query for an image to be edited. The user conversation can be between a computing device and one or more users who speak to the computing device. In one example, directing the user conversation includes broadcasting an editing query (e.g., "Would you like to remove or replace something?"), and receiving a confirmation indicating an object (e.g., "Yes, remove the picnic table"). Hence, directing the user conversation can also include receiving an indication of the replace request or an indication of the remove request.

Pixels of the image corresponding to an object to be removed or replaced indicated in the user conversation are ascertained (block 604). Ascertaining pixels can include determining pixels. The object can indicate or include any suitable object, such as a sky, person, animal, inanimate object, or background of the image. In one example, ascertaining pixels of the image includes determining a set of inverse pixels that do not include the pixels of the image, and determining the pixels of the image from the set of inverse pixels.

Additionally or alternatively, ascertaining the pixels of the image can include generating an object mask for the object, dilating the object mask to create a region bounded by a boundary of the object mask, and generating a refined mask representing the pixels of the image corresponding to the object by separating a background from a foreground in the region. In one example, contributions to pixels in the region from the background of the image are removed.

Furthermore, ascertaining pixels of the image corresponding to the object can be performed by a vision module specific to the object. For instance, a vision module can perform entity segmentation with one or more neural networks trained to identify respective entities in the image. An entity can be any suitable object.

It is determined whether the editing query includes a remove request or a replace request (block 606). In one example, determining whether the editing query includes the remove request or the replace request is based on matching words of the user conversation to lists of words determined to be similar to remove or replace, respectively. Additionally or alternatively, determining whether the editing query includes a remove request or a replace request includes processing the editing query to identify subject-object pairs from a string of words of the user conversation. The string is separated into a first part that contains words of the string related to a subject portion of the subject-object pairs and a second part that contains words of the string related to an object portion of the subject-object pairs. The first part and the second part can be used to obtain images including fill material or replacement material, such as by constructing a search query with terms from the first part or second part.

Responsive to the determining indicating the editing query includes a remove request, blocks 608, 610, and 612 are entered.

Fill material recognized as similar to different pixels of the image than the pixels of the image is obtained (block 608). Fill material can be obtained in any suitable way, such as by obtaining one or more images including fill material. For instance, fill material may be obtained from an image to be edited itself, such as from a different part of the image than the pixels of the image corresponding to an object to be removed. In one example, one or more images including fill material are obtained based on a search of images using the words of the first part of the string words obtained by processing the editing query when determining whether the editing query includes a remove request or a replace request. Additionally or alternatively, fill material can be synthesized (e.g., generated by a process that creates the fill material by methods other than extracting fill material from an image). In one example, fill material is obtained by synthesizing a first fill material, obtaining a second fill material from an image (e.g., an image returned in a search result), and combining the first fill material and the second fill material in any suitable way to form fill material.

Content is removed from the pixels of the image (block 610). Accordingly, a hole in the image is created.

The fill material is added to the pixels of the image to form one or more composite images (block 612). Accordingly, adding the fill material fills a hole created when the content is removed from the pixels. Adding the fill material can include performing background decontamination, as discussed above.

Responsive to the determining indicating the editing query includes a replace request, blocks 614 and 616 are entered.

Replacement material recognized as similar to the pixels of the image and corresponding to the replace request is obtained (block 614). Replacement material can be obtained in any suitable way, such as by obtaining one or more images including replacement material. For instance, replacement material may be obtained from an image to be edited itself, such as from a different part of the image than the pixels of the image corresponding to an object to be replaced. In one example, one or more images including replacement material are obtained based on a search of images using the words of the second part of the string words obtained by processing the editing query when determining whether the editing query includes a remove request or a replace request. Additionally or alternatively, replacement material can be synthesized (e.g., generated by a process that creates the replacement material by methods other than extracting replacement material from an image). In one example, replacement material is obtained by synthesizing a first replacement material, obtaining a second replacement material from an image (e.g., an image returned in a search result), and combining the first replacement material and the second replacement material in any suitable way to form replacement material.

Furthermore, an image including fill material and an image including replacement material can be obtained from a database of images, such as a database of stock images or a user's personal image collection. Additionally or alternatively, one or more images including fill material and one or more images including replacement material can be obtained by forming a query string including combinations of words from the user conversation with synonyms of other words from the user conversation. In one example, the fill material or the replacement material is obtained from at least one image, the at least one image including at least one of the image to be edited or an image in a database of images. Additionally or alternatively, the fill material or the replacement material can be obtained by synthesizing the fill material or the replacement material.

Content of the pixels of the image is replaced with the replacement material to form the one or more composite images (block 616).

The one or more composite images are harmonized to form one or more harmonized images (block 618). Harmonizing can include adjusting lighting of at least one of the one or more composite images to match times of day between image materials.

The one or more harmonized images are exposed in a user interface of the computing device (block 620). In one example, the user interface displays an intermediate image that indicates a candidate object, and confirmation is requested that the candidate object in the intermediate image matches the object indicated by the editing query. The confirmation can be received in multiple modes of input, such as speech and selection with a mouse, concurrently.

Figure 7:
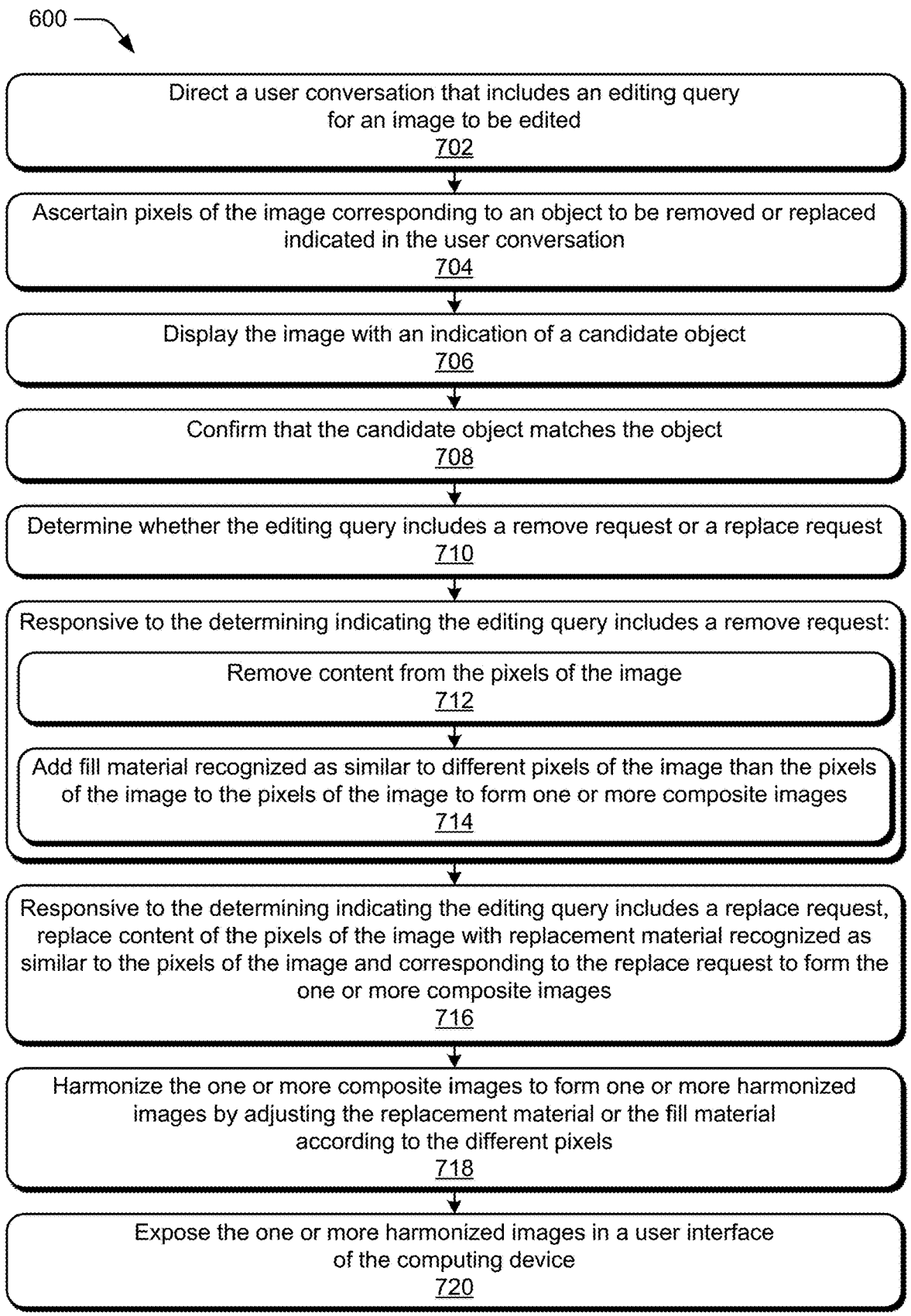
FIG. 7 illustrates a flow diagram depicting an example procedure in accordance with one or more aspects of the disclosure.

FIG. 7 illustrates an example procedure 700 for enhancing an image to be edited by removing or replacing objects in the image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 116 of FIG. 1 that makes use of an image enhancement system, such as system 400 or image enhancement system 110. An image enhancement system implementing procedure 700 may be an independent application that has been installed on the computing device, a service hosted by a service provider that is accessible by the computing device, a plug-in module to the computing device, or combinations thereof.

A user conversation that includes an editing query for an image to be edited is directed (block 702). For instance, a user conversation is a directed user conversation, such as in a question and answer format, interview format, and the like. A user conversation can be between a computing device and one or more users who speak to the computing device.

Pixels of the image corresponding to an object to be removed or replaced indicated in the user conversation are ascertained (block 704). In one example, pixels are determined with a vision module specific to the object including a neural network trained to identify the object with a training set of images including different instances of the object (e.g., trained to identify a person using training images with different people).

The image is displayed with an indication of a candidate object (block 706). Examples of an indication include a lasso, a highlight, an arrow, a pattern, a mask, a text box, a shadow, a container (e.g., lasso, box, rectangle, blob, circle, ellipse and the like enclosing part of the object), and the like.

It is confirmed that the candidate object matches the object (block 708). Confirming that the candidate object image matches the object can include receiving a multi-modal user input to correct the candidate object. One of the modes can be speech, and another mode can be input from a keyboard, mouse, stylus, gesture, or touchscreen, and the like.

It is determined whether the editing query includes a remove request or a replace request (block 710). For instance, the editing query can be processed by a language processor to identify keywords, including subject-object pairs, subject-object-predicate triplets, and the like to determine an object to be removed, an object to be replaced, an object to replace an object to be replaced, descriptors of objects (e.g., a year and color of an automobile), and the like. Predicates and synonyms of predicates can be matched to lists of synonyms for editing functions (e.g., remove and replace) to determine whether the editing query includes a remove request or a replace request.

Responsive to the determining indicating the editing query includes a remove request, blocks 712 and 714 are entered.

Content is removed from the pixels of the image (block 712). By removing content from the pixels, a hole is created in the image, which can be filled with fill material.

Fill material recognized as similar to different pixels of the image than the pixels of the image is added to the pixels of the image to form one or more composite images (block 714). In one example, the different pixels correspond to a background of the image. Additionally or alternatively, the different pixels can correspond to another object in the image, a foreground of the image, or any suitable portion of the image.

Responsive to the determining indicating the editing query includes a replace request, content of the pixels of the image is replaced with replacement material recognized as similar to the pixels of the image and corresponding to the replace request to form the one or more composite images (block 716). For instance, a sky background may be replaced with another sky background, but of different weather indicated in the editing query.

The one or more composite images are harmonized to form one or more harmonized images by adjusting the replacement material or the fill material according to the different pixels (block 718). In one example, harmonizing is performed by a harmonization module specific to the object. Harmonizing removes editing artifacts (e.g., compositing artifacts) and makes the harmonized images look natural so that fill material and replacement material is not easily detectable to an observer. Harmonizing can include adjusting pixels other than pixels of fill material or replacement material.

The one or more harmonized images are exposed in a user interface of the computing device (block 720). In one example, the user interface accepts multi-modal input. Additionally or alternatively, the user interface can be displayed in part or in whole responsive to obtaining the image to be edited (e.g., upon the image being loaded into image enhancement system 110).

The procedures described herein constitute an improvement over procedures that manually remove or replace an object in an image to be edited without the benefit of a directed user conversation. The procedures described herein generate multiple solutions satisfying a replace request or a remove request automatically and without requiring a high level of training by a user. Even neophyte users can generate naturally-looking harmonized images that remove or replace an object in an image without relying on another party, such as an on-line photo editing service, or a friend who knows how to use Adobe's Photoshop® like an expert. A user merely needs to provide an image to be edited and participate in a directed conversation with a computing device to obtain harmonized images that remove or replace an object in the image. Accordingly, a user can generate many naturally-looking harmonized images quickly, cheaply, and with little effort and delay compared to methods that manually remove or replace an object in an image to be edited without the benefit of a directed user conversation. Furthermore, by exposing intermediate images and accepting multi-modal input for a user's image, rather than a tutorial image, the methods described herein instruct the user on the use of the editing application while operating on the user's actual data, rather than an image with little meaning to the user. Moreover, by receiving multi-modal user input during a directed user conversation, the methods described herein are reliable compared to other methods (e.g., the methods described herein correctly interpret a user's commands when other methods fail). Thus, a user of the methods described herein is less frustrated than a user of other methods that do not receive multi-modal user input during a directed user conversation.

Having considered example procedures in accordance with one or more implementations, consider now example systems and devices that can be utilized to practice the inventive principles described herein.

Example Systems and Devices

FIG. 8 illustrates an example system generally at 800 that includes an example computing device 802 that is representative of one or more computing systems and devices that may implement the various techniques described herein. This is illustrated through inclusion of image enhancement system 110, system 400, image enhancement application 120, and image support system 118, which operate as described above. Computing device 802 may be, for example, a user computing device (e.g., one of computing devices 104), or a server device of a service provider, (e.g., server 116). Furthermore, computing device 802 may include an on-chip system, multiple computing devices, combinations thereof, or any other suitable computing device or computing system. Accordingly, FIG. 8 illustrates computing device 802 as one or more of a tablet, a laptop computer, a smart phone, smart eye glasses, and a camera, though these examples are illustrative and in no way are meant to limit the type or number of devices included in computing device 802.

The example computing device 802 includes a processing system 804, one or more computer-readable media 806, and one or more I/O interfaces 808 that are communicatively coupled to each other. Although not shown, computing device 802 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 804 is representative of functionality to perform one or more operations using hardware. Accordingly, processing system 804 is illustrated as including hardware elements 810 that may be configured as processors, functional blocks, and so forth. This may include implementation in hardware as an application specific integrated circuit or other logic device formed using one or more semiconductors. Hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 124 in FIG. 1 are an example of processing system 804.

Computer-readable storage media 806 is illustrated as including memory/storage 812. Storage 126 in FIG. 1 is an example of memory/storage included in memory/storage 812. Memory/storage component 812 may include volatile media (such as random access memory (RAM)), nonvolatile media (such as read only memory (ROM), Flash memory, optical disks, magnetic disks, and so forth), or combinations thereof. Memory/storage component 812 may include fixed media (e.g., RAM, ROM, a fixed hard drive, and so on) as well as removable media (e.g., Flash memory, a removable hard drive, an optical disc, and so forth). Computer-readable media 806 may be configured in a variety of other ways as further described below.

Input/output interface(s) 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 802 may be configured in a variety of ways as further described below to support user interaction.

Computing device 802 also includes applications 814. Applications 814 are representative of any suitable applications capable of running on computing device 802, and may include a web browser which is operable to access various kinds of web-based resources (e.g., assets, media clips, images, content, configuration files, services, user profiles, and the like). Applications 814 include image enhancement application 120, as previously described. Furthermore, applications 814 includes any applications supporting image enhancement system 110, system 800, and image support system 118.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 802. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 1106 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 810, or combinations thereof. Computing device 802 may be configured to implement particular instructions and functions corresponding to the software and hardware modules. Accordingly, implementation of a module that is executable by computing device 802 as software may be achieved at least partially in hardware, e.g., through use of computer-readable storage media and hardware elements 810 of processing system 804. The instructions and functions may be executable/operable by one or more articles of manufacture (for example, one or more computing devices 802 or processing systems 804) to implement techniques, modules, and examples described herein.

The techniques described herein may be supported by various configurations of computing device 802 and are not limited to the specific examples of the techniques described herein. This functionality may also be implemented all or in part through use of a distributed system, such as over a "cloud" 816 via a platform 818 as described below.

Cloud 816 includes and is representative of a platform 818 for resources 820. Platform 818 abstracts underlying functionality of hardware (e.g., servers) and software resources of cloud 816. Resources 820 may include applications, data, or applications and data that can be utilized while computer processing is executed on servers that are remote from computing device 802. Resources 820 can also include services provided over the Internet, through a subscriber network, such as a cellular or Wi-Fi network, or combinations thereof. Resources 820 can include asset store 822, which stores assets, such as images, photographs (e.g., user images in a gallery, a database of stock photographs, and the like), document templates, user profile data, user image libraries, such as photographs posted in a shared photo service, and the like, and may be accessed by computing device 802.

Platform 818 may abstract resources and functions to connect computing device 802 with other computing devices. Platform 818 may also serve to abstract scaling of resources to provide a corresponding level of scale to encountered demand for resources 820 that are implemented via platform 818. Accordingly, in an interconnected device embodiment, implementation of functionality described herein may be distributed throughout system 800. For example, the functionality may be implemented in part on computing device 802 as well as via platform 818 that abstracts the functionality of cloud 816.

CONCLUSION

In one or more implementations, a digital medium environment includes at least one computing device. Systems and techniques are described herein for directing a user conversation and enhancing an image to be edited by removing and replacing objects in the image based on the directed user conversation. A directed user conversation is directed, e.g., in a question-and-answer interview format, to obtain an editing query and parameters of the editing query. Pixels corresponding to an object in the image indicated by the editing query are ascertained by computer vision methods specific to the type of object. The editing query is processed to determine whether it includes a remove request or a replace request. Based on processing the editing query, a search query is constructed to obtain images, such as from a database of stock images, including fill material or replacement material to fulfill the remove request or replace request, respectively. Composite images are generated from the fill material or the replacement material and an image to be edited according to the editing query, and the composite images are harmonized to remove editing artifacts and make the images look natural. A user interface exposes images, including harmonized images, composite images, and intermediate images. The user interface accepts multi-modal user input during the directed user conversation.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to edit images, a method implemented by a computing device, the method comprising:
   initiating a device-directed conversation that includes one or more questions generated by the computing device and one or more user responses to the one or more questions;
   extracting an editing query for an image to be edited from the one or more questions and the one or more user responses to the one or more questions;
   determining an object in the image based on a description of the object in the editing query and semantic knowledge of the image; and
   directing the device-directed conversation including, during the device-directed conversation:
      initiating an image search based on the object in the image;
      providing an updated question about the object based on results of the image search; and
      editing the object in the image based on an additional user response to the updated question about the object.

2. The method as described in claim 1, wherein the directing the device-directed conversation includes:
   broadcasting the editing query; and
   receiving a confirmation in multiple modes of input indicating the object.

3. The method as described in claim 1, further comprising:
   ascertaining pixels of the image corresponding to the object in the image;
   obtaining replacement material recognized as similar to content of the pixels of the image corresponding to the object; and wherein the editing the object in the image includes replacing the content of the pixels of the image corresponding to the object with the replacement material to form one or more composite images determining a set of inverse pixels that do not include the pixels of the image.

4. The method as described in claim 3, wherein the ascertaining the pixels of the image corresponding to the object comprises:
   generating an object mask for the object;
   dilating the object mask to create a region bounded by a boundary of the object mask; and
   generating a refined mask representing the pixels of the image corresponding to the object by separating a background from a foreground in the region.

5. The method as described in claim 4, further comprising removing contributions from the background to region pixels of the pixels of the image corresponding to the object that are in the region.

6. The method as described in claim 3, further comprising:
   identifying subject-object pairs from a string of words of the device-directed conversation;
   separating the string into a subject portion that includes subject words of the subject-object pairs and an object portion that includes object words of the subject-object pairs; and
   wherein the image search is based on the object portion and the replacement material is obtained from the results of the image search based on the additional user response to the updated question about the object.

7. The method as described in claim 3, wherein the replacement material is obtained from at least one of the image to be edited or an additional image in an image database.

8. The method as described in claim 3, wherein the replacement material is obtained by synthesizing the replacement material.

9. The method as described in claim 3, further comprising:
   harmonizing the one or more composite images to form one or more harmonized images by adjusting the replacement material; and
   exposing the one or more harmonized images in a user interface of the computing device.

10. The method as described in claim 1, further comprising determining that the editing query includes a replace request based on matching words of the device-directed conversation to lists of similar words determined to be similar to replace.

11. The method as described in claim 1, further comprising:
    displaying an intermediate image that indicates a candidate object; and
    requesting confirmation that the candidate object in the intermediate image matches the object in the image.

12. The method as described in claim 1, further comprising receiving an indication that the image is to be edited, and wherein the initiating the device-directed conversation is responsive to the receiving the indication.

13. A system implemented by a computing device in a digital medium environment, the system including modules implemented at least partially in hardware of the computing device, the system comprising:
    a conversation module to direct a device-directed conversation that includes multiple volleys of one or more questions generated by the computing device and one or more user responses to the one or more questions, the device-directed conversation narrowed in scope with each volley of the multiple volleys;
    the conversation module to extract an editing query for an image to be edited from the one or more questions and the one or more user responses to the one or more questions;
    a language module to determine an object in the image based on a description of the object in the editing query and semantic knowledge of the image; and
    a compositing module to edit the object in the image based on the editing query to form one or more composite images.

14. The system as described in claim 13, further comprising:
    a vision module to ascertain pixels of the image corresponding to the object;
    an image search module to obtain fill material recognized as similar to content of different pixels of the image than the pixels of the image corresponding to the object; and
    the compositing module to:
       remove object content from the pixels of the image corresponding to the object; and
       add the fill material to the pixels of the image corresponding to the object to form the one or more composite images.

15. The system as described in claim 14, wherein the image search module is configured to obtain the fill material by forming a query string including combinations of words from the device-directed conversation with synonyms of other words from the device-directed conversation.

16. The system as described in claim 13, wherein the conversation module is implemented to determine the scope of the device-directed conversation based on an availability of resources to fulfill the editing query.

17. The system as described in claim 13, wherein the language module is implemented to:
assign vectors in a vector space to words in the description of the object in the editing query, the vectors being positioned in the vector space relative to one another based on the words sharing a common context;
remove punctuations and stop words from the editing query;
assign an additional vector in the vector space to a result of removing the punctuations and the stop words from the editing query;
determine similarity scores between the vectors assigned to the words and the additional vector assigned to the result of removing the punctuations and the stop words from the editing query; and
determine the object in the image based on the similarity scores.

18. In a digital medium environment to edit images, a method implemented by a computing device, the method comprising:
a step for directing a device-directed conversation that includes an editing query for an image to be edited and indicates an object to be removed or replaced, the device-directed conversation including a question that repeats the object to confirm the object without asking for correction of the object;
a step for ascertaining pixels of the image corresponding to the object;
a step for determining whether the editing query includes a remove request or a replace request; and
responsive to the remove request, steps for removing object content from the pixels of the image corresponding to the object; and adding fill material to the pixels of the image corresponding to the object to form one or more composite images, the fill material recognized as similar to additional content of different pixels of the image than the pixels of the image corresponding to the object; or
responsive to the replace request, a step for replacing the object content of the pixels of the image corresponding to the object with replacement material recognized as similar to the object content and corresponding to the replace request to form the one or more composite images.

19. The method as described in claim 18, further comprising:
a step for displaying the image with an indication of a candidate object; and
a step for confirming that the candidate object matches the object including receiving a multi-modal user input to correct the candidate object.

20. The method as described in claim 18, wherein the device-directed conversation includes user speech and computer-generated speech.

* * * * *

UNITED STATES PATENT AND TRADEMARK OFFICE
CERTIFICATE OF CORRECTION

PATENT NO. : 10,613,726 B2  
APPLICATION NO. : 15/852253  
DATED : April 7, 2020  
INVENTOR(S) : Scott David Cohen, Brian Lynn Price and Abhinav Gupta Page 1 of 1

It is certified that error appears in the above-identified patent and that said Letters Patent is hereby corrected as shown below:

In the Claims

Column 37, Line 45, in Claim 3, after "composite images", delete "determining a set of inverse pixels that do not include the pixels of the image", therefor.

Signed and Sealed this  
Sixteenth Day of June, 2020

Andrei Iancu  
*Director of the United States Patent and Trademark Office*